United States Patent
Hurst et al.

(10) Patent No.: US 7,411,864 B2
(45) Date of Patent: Aug. 12, 2008

(54) METHOD FOR PROCESSING SIGNALS IN A CEMENT BONG LOGGING TOOL

(75) Inventors: Brian Hurst, Mineral Wells, TX (US); John L. Marshall, Arlington, TX (US); David M. O'Connor, Burleson, TX (US)

(73) Assignee: Probe Technology Services, Inc., Fort Worth, TX (US)

( * ) Notice: Subject to any disclaimer, the term of this patent is extended or adjusted under 35 U.S.C. 154(b) by 236 days.

(21) Appl. No.: 11/233,720

(22) Filed: Sep. 23, 2005

(65) Prior Publication Data

US 2007/0070810 A1 Mar. 29, 2007

(51) Int. Cl.
*G01V 1/48* (2006.01)

(52) U.S. Cl. .............................. 367/35; 367/25; 367/33; 340/853.3

(58) Field of Classification Search .................. 367/25, 367/35, 911, 912, 33; 181/103, 105; 340/853.3
See application file for complete search history.

(56) References Cited

U.S. PATENT DOCUMENTS

| | | | |
|---|---|---|---|
| 3,309,653 A | 3/1967 | Martin et al | 340/10 |
| 3,729,705 A | 4/1973 | Grijalva | 340/18 |
| 4,885,724 A * | 12/1989 | Read et al. | 367/77 |
| 5,036,945 A * | 8/1991 | Hoyle et al. | 367/25 |
| 5,043,952 A | 8/1991 | Hoyle et al. | 367/159 |
| 5,089,989 A | 2/1992 | Schmidt et al. | 367/35 |
| 5,253,219 A * | 10/1993 | Houston et al. | 367/79 |
| 5,377,160 A | 12/1994 | Tello et al. | 367/35 |
| 6,135,234 A * | 10/2000 | Harris et al. | 367/25 |
| 6,568,486 B1 * | 5/2003 | George | 175/45 |
| 6,614,360 B1 | 9/2003 | Leggett, III et al. | 340/853.1 |
| 2004/0257912 A1 | 12/2004 | Dubinsky et al. | 367/81 |

\* cited by examiner

*Primary Examiner*—Ian J Lobo
(74) *Attorney, Agent, or Firm*—Whitaker, Chalk, Swindle & Sawyer, LLP; Stephen S. Mosher

(57) ABSTRACT

A longitudinally segmented acoustic transducer for a cement bond logging (CBL) tool having a plurality of adjoining PZT ring-like segments driven synchronously in parallel by one or more pulses and caused to vibrate in an anti-resonant mode, substantially below the resonant frequency of an individual segment when used in a transmitting application. When used in a receiving application, each of the plurality of transducer rings are caused to vibrate by acoustic signals detected by the transducer array, also in an anti-resonant mode. High speed digital signal processing enables on-depth, high quality data for all azimuths at each depth to be obtained, processed, normalized and either sent to the surface in real time for each 20 Hz firing cycle, as the CBL tool is pulled toward the surface, or stored in a memory module in digital form for later retrieval. Built-in calibration factors used for normalizing the output signals to the operating conditions of use may be accessed at any time.

16 Claims, 15 Drawing Sheets

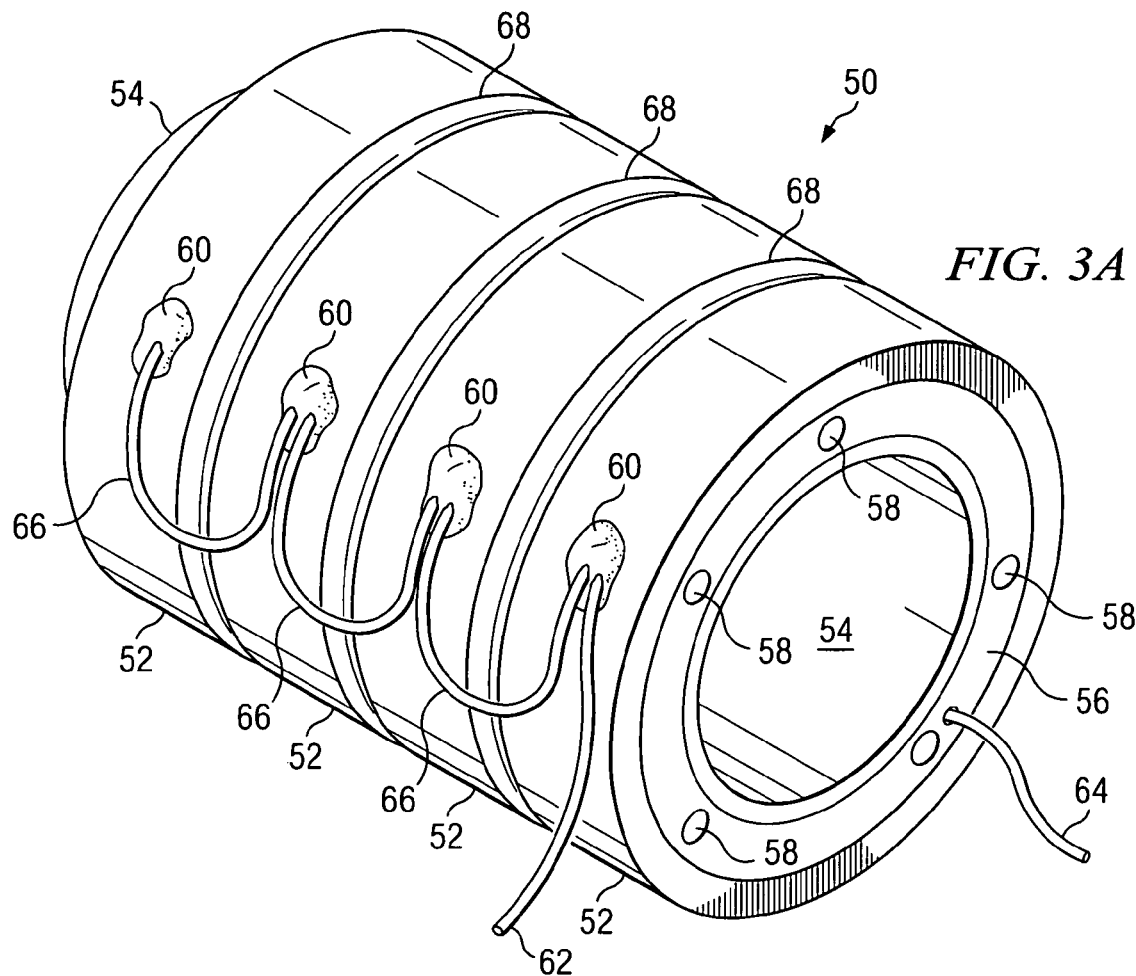
*FIG. 3A*
*FIG. 3B*
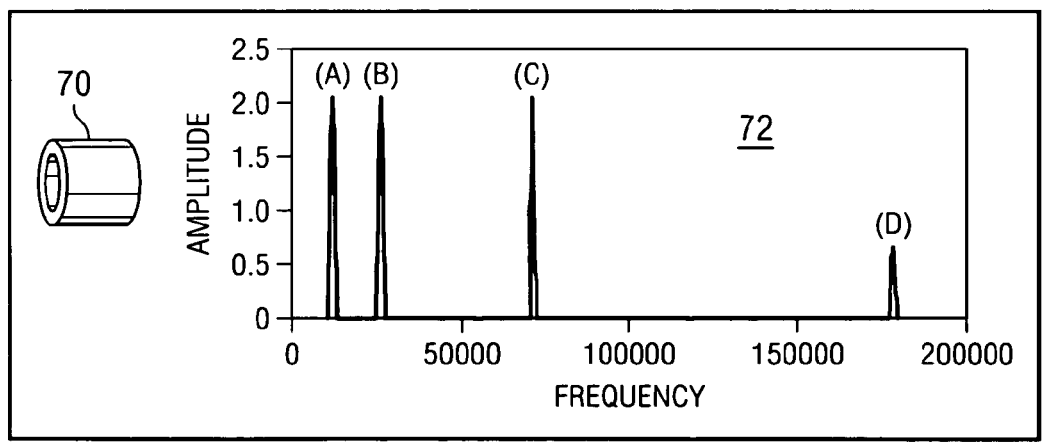

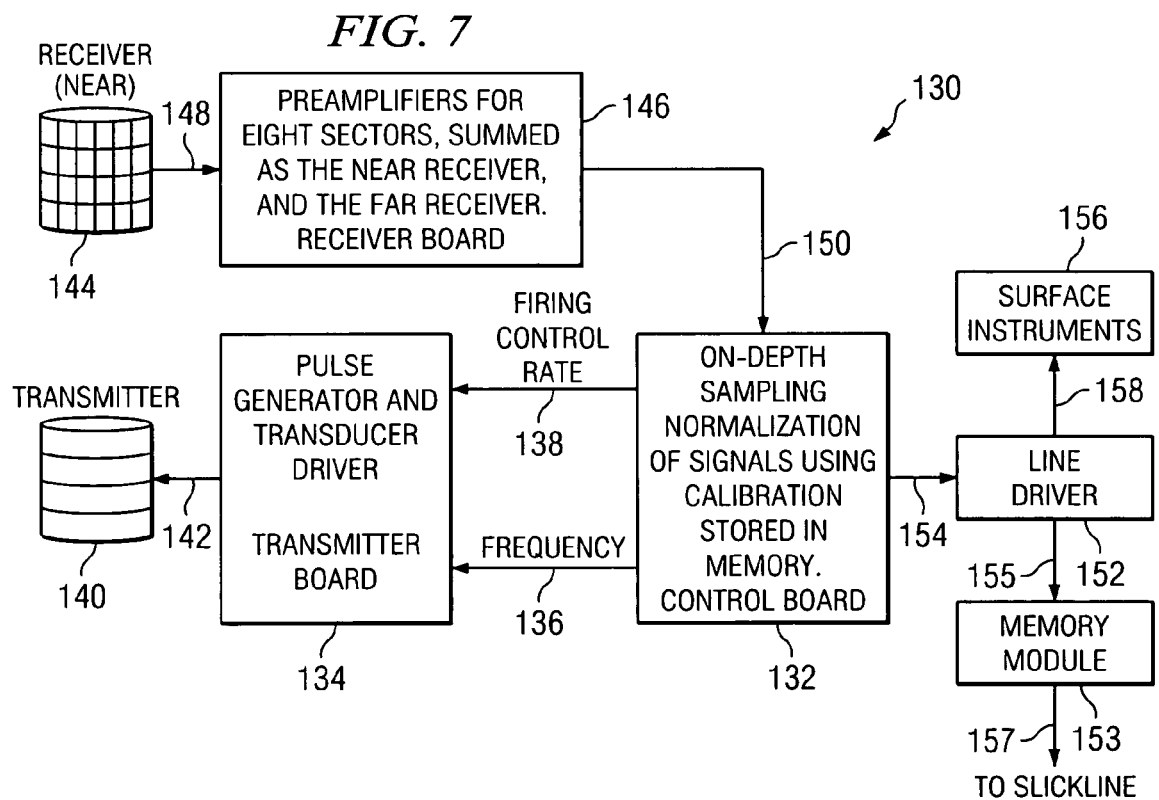

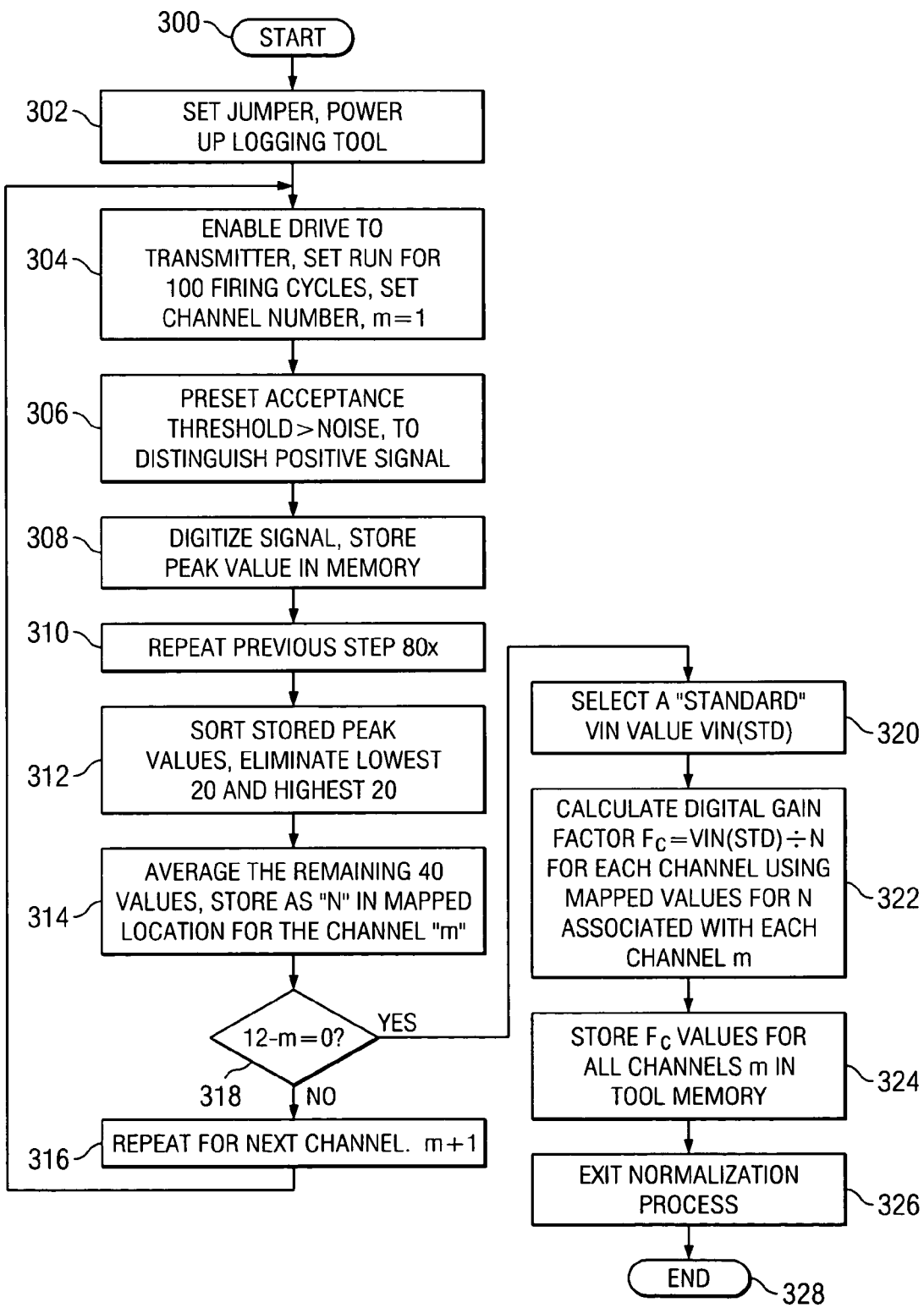

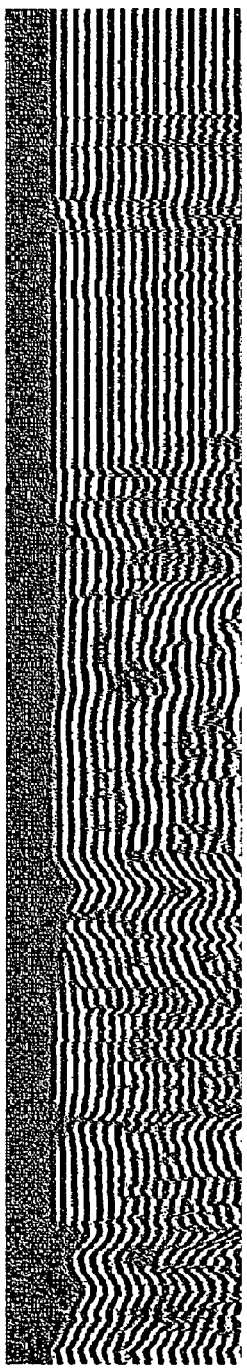 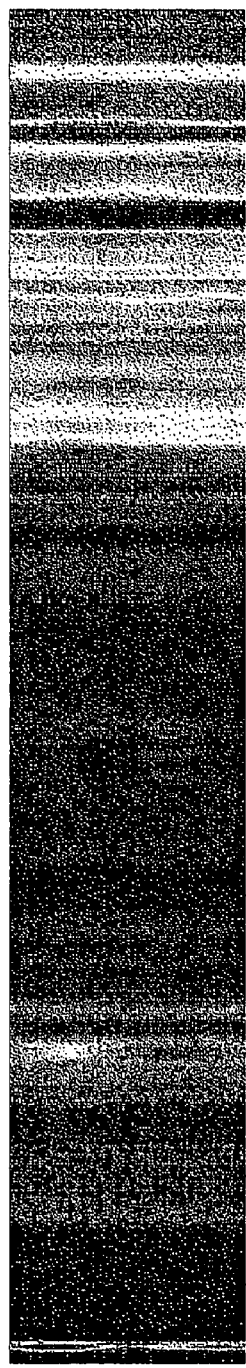 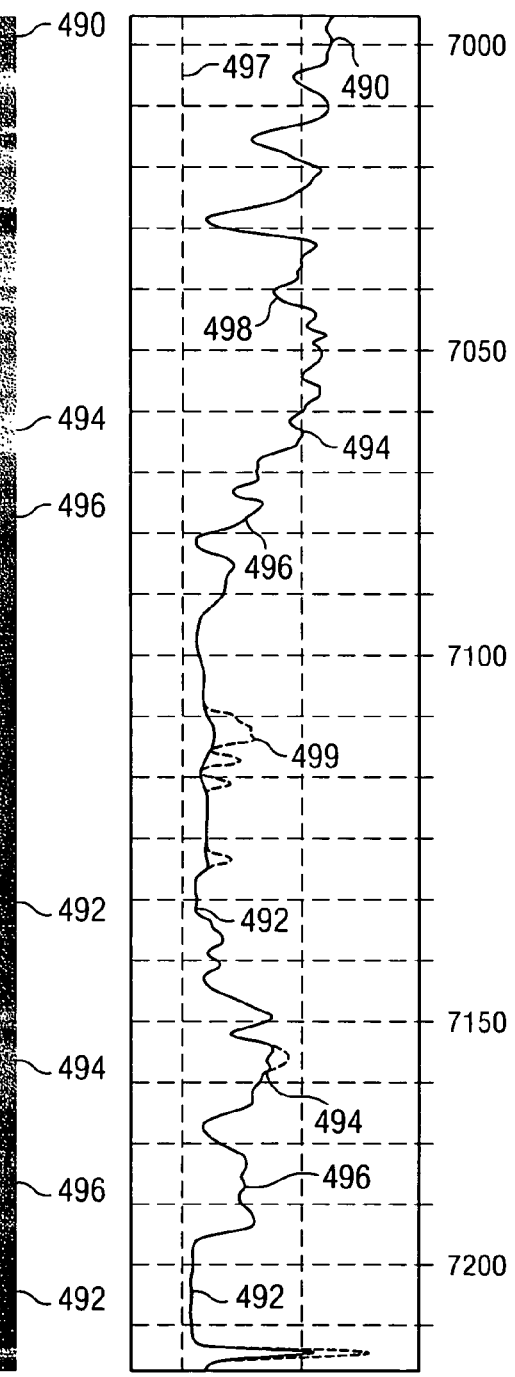
*FIG. 15A*  *FIG. 15B*  *FIG. 15C*

METHOD FOR PROCESSING SIGNALS IN A CEMENT BONG LOGGING TOOL

CROSS REFERENCE TO RELATED APPLICATIONS

The present U. S. Patent Application is related to co-pending U. S. Patent Application entitled SONIC INSTRUMENTATION APPARATUS AND METHOD FOR CEMENT BOND LOGGING, and also to co-pending U. S. Patent Application entitled METHOD FOR NORMALIZING SIGNALS IN A CEMENT BOND LOGGING TOOL, both filed by the same applicant on the same date as the present application.

BACKGROUND OF THE INVENTION

1. Field of the Invention

The present invention generally relates to instrumentation for logging conditions in down hole formations and, more particularly to transducer design and uses thereof in acoustic logging instrumentation. The acoustic transducer designs disclosed herein may be adapted to a variety of applications, including, for example, cement bond logging.

2. Background of the Invention and Description of the Prior Art

The use of piezoelectric materials such as a polycrystaline form of lead titanate or lead zirconate titanate, sometimes referred to as "PZT" material, has long been known. This material is generally formed as a continuous ceramic element, usually cylindrical in shape and sized to fit within the dimensions of a cement bond logging tool. Such tools are available in various diameters for use with well casings typically used in oil and gas drilling operations. Other shapes may be used in some logging tool instrumentation, depending upon the particular application. As is well known, these piezoelectric, ceramic PZT elements, according to their dimensions, have characteristic resonant frequencies. A given element or crystal may have more than one mode of vibration in which it behaves in accordance with its piezoelectric property. The crystal may vibrate in the presence of an electric field alternating at or near the resonant frequency of the crystal when imposed across the crystal. Or, the crystal may produce an alternating voltage in the presence of sufficient mechanical stress at or near the resonant frequency of the crystal. The ceramic crystal is usually coated on two opposing surfaces with an electrical conductor such as silver to which electrodes may be attached for connection to electronic circuitry. Thus, the crystal may be caused to vibrate at its resonant frequency by application of a suitable excitation signal applied to the two electrodes. Conversely, the crystal may vibrate in the presence of an acoustic disturbance or wave and generate an alternating electric voltage between the two electrodes.

In conventional cement bond logging tools, a cylindrical piezoelectric crystal having dimensions suited to behave in a predictable manner at a chosen frequency of resonance, may be used in both transmitting transducers and receiving transducers. In a transmitter, the crystal is excited by an electrical signal, for example 20 KHz, and caused to vibrate at that frequency, emitting acoustic energy into the surroundings—much as an antenna would. In a receiver, the crystal, tuned according to its dimensions to vibrate at the same 20 KHz frequency, produces an alternating 20 KHz voltage across its terminals when it is in the presence of the acoustic signal generated by the transmitter. The receiver thus acts as a sensor, responding to the acoustic energy that has traveled through the surroundings of the instrument containing the transducers.

The surroundings may include the well casing, the cement in the bore hole that surrounds the well casing, and the nearby rock formation through which the borehole has been drilled. The acoustic energy sensed by the receiving transducer is conveyed by the acoustic waveform as it is modified by attenuation, reflection, refraction and interference that may be encountered by the signal along the particular path between the transmitter and the receiver. Typically, the paths taken by the transmitted acoustic signal may include (a) the body of the logging tool; (b) the fluid in the well casing; (c) the well casing; (d) the cement or any other materials in the well outside of the well casing; and (e) the formation or lithography through which the well is bored. Operators of the surface instrumentation coupled to the logging tool sensor, by observing the received signal, may thus obtain information about the well casing, the cement bond and the surrounding lithography by recording and interpreting the received acoustic signal. The signal obtained from the receiver is typically processed to preserve essential information and formatted for display at the surface.

Operation of the cement bond logging tools must occur in some highly challenging environments. For example, the temperatures in a well may reach 350 to 400 degrees Fahrenheit. Further, the pressures in the well at depths on the order of many thousands of feet may reach 20,000 pounds per square inch (psi). These environmental conditions impose severe stresses upon the electronics and the mechanical structures of the instrument. Further, conventional PZT elements typically function most efficiently at or near resonance, to avoid the effects of spurious vibrations that can interfere with the intended signals, thus limiting their usefulness as transducers. For example, the crystals often generate harmonics of the desired frequency, which can result in intermodulation products within the band of interest near the fundamental or desired signal. In addition, operation of the crystal at only one frequency limits the utility of the transducers to the use of only the one frequency.

Other aspects of prior art logging tools that limit their utility and efficiency include the following. The processing of the data signals tends to be relatively slow in comparison to the amount of data that can be provided by the transducer. At the rates the tool is typically pulled toward the surface while taking the data, the data "packet" from each of the usual eight, radially (i.e., circumferentially) arranged sectors of the transducer must be transmitted to the surface with a delay imposed between the data for each sector. Thus, the data provided represents the conditions at a sequence of helically positioned sites along the outside of the well casing. Thus, no two adjoining data "packets" occur at the same depth or azimuth, and no complete sets of data "packets" provide information about the complete circumference, in all eight equally-spaced azimuth directions, of the well casing at a single depth. The result is that the data only represents a small and often insufficient sampling of the cement bond as the tool is pulled upward.

Moreover, because of the need to limit the upward rate, in feet-per-minute, that the tool is pulled toward the surface so that an adequate amount of data is obtained, substantial time is required to produce a complete cement bond log. Additional time is required just in setting up the instrument for operation. Especially time consuming is the time needed to calibrate the instrument for the particular logging operation. As is well known, the wire line used to support the logging tool in the well casing is a very long conductor having a large distributed reactive impedance characteristic in addition to the DC resistance of the conductor in the wire line. When the wire line is used to transmit analog signals to the surface instrumentation, this complex impedance and the length of the wire line must be compensated and usually involves tedious adjustments of the gain of each of the eight or more analog preamplifiers in the logging tool. Further, the particular adjustments are usually applicable only for the conditions existing at the time these adjustments are made because they are subject to being invalid as the logging tool is moved to another location, used with another surface vehicle, the temperature or other conditions in the well casing change, etc. In some logging tools, when a wire known as a "slickline" is used—simply a wire for supporting the tool that is not also used to transmit the data—the data in digital form may be stored in a memory device in or attached to the logging tool and accessed after the tool is returned to the surface.

The foregoing disadvantages and inefficiencies are substantially overcome by the features of the present invention to be described herein below.

SUMMARY OF THE INVENTION

Accordingly, a longitudinally segmented acoustic transducer for a cement bond logging (CBL) tool is disclosed comprising a thin-walled piezoelectric cylinder divided longitudinally (axially) into a plurality of band-like transducer rings separated by resilient circular spacers disposed between proximate edges of each pair of transducer rings thereby forming a transducer array. When used in a transmitting application, the plurality of transducer rings are driven synchronously in parallel by one or more pulses provided by the output of a pulse generator and caused to vibrate in an anti-resonant mode, that is, at a frequency substantially below the resonant frequency of an individual transducer ring. When used in a receiving application, each of the plurality of transducer rings are caused to vibrate by acoustic signals detected by the transducer array, and in an anti-resonant mode at a frequency substantially below the resonant frequency of each individual transducer ring in the transducer array.

In another aspect, an acoustic logging tool is provided comprising a tubular housing supported in a well casing and having at least a transmitting section and first and second receiver sections spaced longitudinally from the transmitting section by predetermined first and second distances wherein at least one of the first and second receiver sections is configured as an acoustic transducer having a thin-walled, piezoelectric cylinder divided axially into a plurality of band-like transducer rings separated by resilient circular spacers disposed between proximate edges of each pair of transducer rings thereby forming a transducer array.

In another aspect of the invention, there is provided an acoustic logging tool, comprising a tubular housing supported in a well casing and having at least a transmitting section and first and second receiver sections spaced longitudinally from the transmitting section by predetermined first and second distances wherein a transmitter section configured as an acoustic transducer having a thin-walled, piezoelectric cylinder divided axially into a plurality of band-like transducer rings separated by resilient circular spacers disposed between proximate edges of each pair of transducer rings thereby forming a transducer array.

In another aspect of the invention, a method is provided for processing electrical signals produced by a longitudinally segmented acoustic receiving transducer in a logging tool, wherein synchronizing pulses are issued to the longitudinally segmented receiving transducer at a predetermined repetition rate and wherein the transducer output signals are processed at high speed in digital signal processing circuitry to provide signals normalized in real time according to built-in calibration factors and having a high signal-to-noise ratio and a high degree of clarity, thereby extending the usable range of data that is sent to the surface instrumentation.

In yet another aspect of the invention, a method is provided for normalizing transducer signals produced by an acoustic receiver in a logging tool having at least one longitudinally segmented receiving transducer comprising the steps of: coupling the electrical output signals of the parallel-connected transducer rings to a digital signal processing circuit to be digitized and stored in memory in the logging tool; and normalizing the digitized electrical output signals, wherein the step of normalizing comprises the steps of initializing circuitry in the logging tool for executing a normalization program upon a predetermined sequence of transmitter excitation signals; executing the normalization program to produce digital gain factors based on an average value N of a plurality of representative samples of a received signal; and obtaining a digital gain factor for use with each channel of the digital signal processing circuit in the logging tool.

BRIEF DESCRIPTION OF THE DRAWINGS

FIG. 3A illustrates a cylindrical piezoelectric transducer array configured as four adjoining cylindrical segments, axially defined and arranged according to the present invention, for use in the embodiment of FIG. 1;

FIG. 3B illustrates an amplitude vs. frequency graph of the responses of a non-segmented cylindrical piezoelectric resonator having a diameter of 1.50 inches and a length of 1.00 inch;

FIG. 7 illustrates a block diagram of the signal processing circuitry for the piezoelectric transducers according to an embodiment of the present invention;

FIG. 10 illustrates a flow chart of one embodiment of a process for normalizing a cement logging tool according to the present invention for use in the system of FIG. 7 using the transducer of FIG. 3A;

FIGS. 15A, 15B, and 15C illustrate a typical VDL ("Z axis" plot) in FIG. 16A together with a corresponding cement map in FIG. 16B, wherein different colors or shading densities represent different cement densities, and an amplitude vs. time graph in FIG. 15C of the signal representing the density information of FIG. 15B.

DETAILED DESCRIPTION OF THE INVENTION

For the purposes of this detailed description several terms are defined as follows. The basic geometric form of many transducers used in down-hole logging tools is a cylinder having a longitudinal axis defined through the center of the cylinder and a radius with respect to this axis that defines the outer and inner surfaces. Elements of the transducers are typically disposed in or on the outer portions of the cylindrical form. In the prior art, it is known to arrange these elements circumferentially or azimuthally around the cylindrical form, often with equal spacings and, correspondingly, equal radial angles, between the adjacent elements. In the present description, these elements will be identified as radial sectors of the transducer.

In the present invention to be described, the transducer elements may be subdivided and arranged in the direction of the longitudinal axis. The individual subdivisions, which may be placed adjacent to each other or separated by a thin intervening ring or washer structure, thus resemble shortened cylindrical elements having a band-like or ring-like configuration, assembled along and centered on the same longitudinal axis. Such transducer elements are identified as longitudinal or axial segments of the transducer.

In one embodiment to be described in FIG. 3A herein below, a transducer is configured as a cylindrical segmented transducer formed of an assembly of several adjoining segments. In an alternate embodiment to be described in FIG. 4, a cylindrical transducer may be subdivided both radially into sectors and axially into segments. As will be appreciated by persons skilled in the art, a segmented piezo electric, cylindrical transducer of a given overall length that is subdivided into two or more segments will have different resonant characteristics, wherein each segment of the array will resonate at a correspondingly higher frequency than an unsegmented transducer of the same dimensions. If the segmented transducer is operated at the same frequency (or within the vicinity of the same frequency) as the resonant frequency of the unsegmented transducer of the same overall dimensions, each segment will be operated in a anti-resonant mode well-displaced from other spectral components related to the resonant frequency of the segment. When the segments of such an array are coupled together and used as either a transmitter or a receiver, this anti-resonant operation provides substantial advantages in the performance of a cement bond logging tool, as will become evident in the description that follows. Moreover, this improved performance is further enhanced through additional features incorporated into the design of the logging tool.

Figure 1:
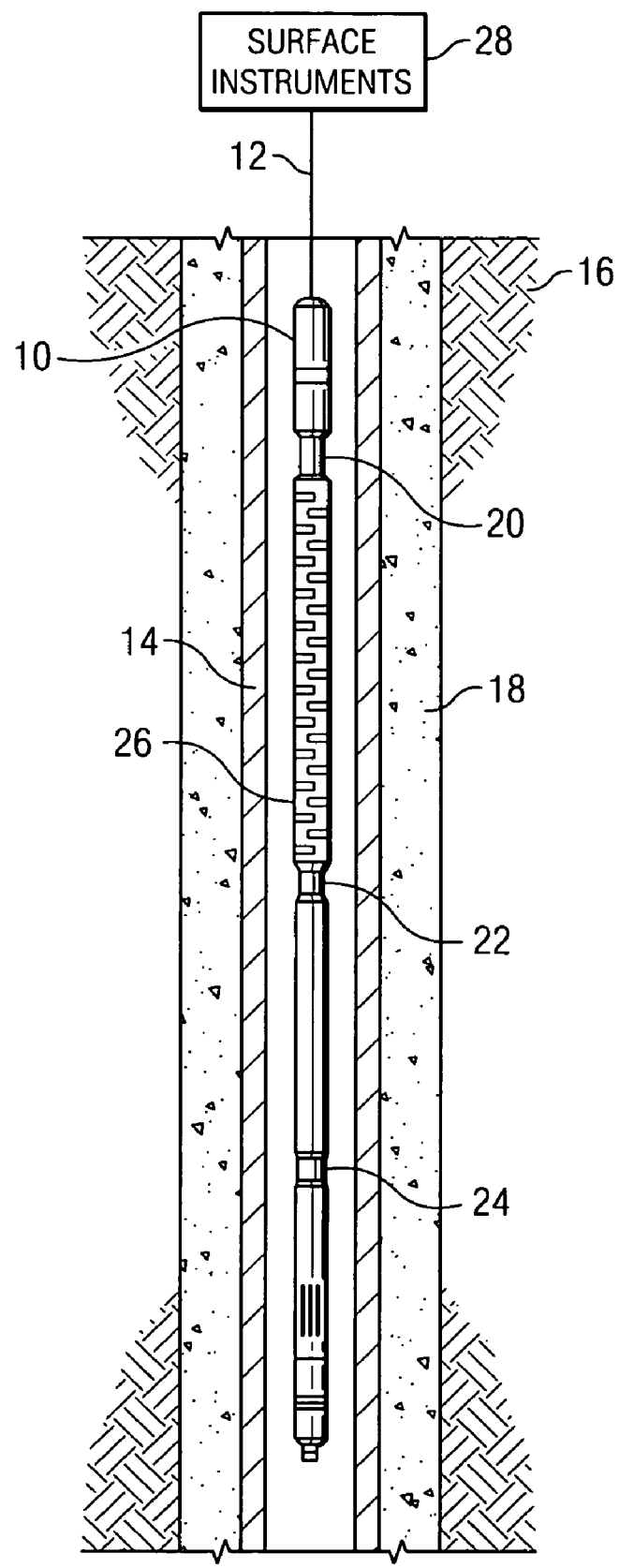
FIG. 1 illustrates a cement bond logging tool suspended in a cement-bonded well casing according to one embodiment of the present invention.

Referring to FIG. 1, there is illustrated a cement bond logging tool suspended in a cement-bonded well casing according to one embodiment of the present invention. The cement bond logging tool 10 is shown suspended by a wire line 12 in a well casing 14 in a bore hole within a formation 16. The wire line 12 is connected to the surface instrumentation 28 and thus conveys data therealong, and also functions to support the logging tool 10 within the well casing 14. In an alternate embodiment to be described, the wire line 12 may be implemented merely as a wire for supporting the logging tool 10, without also being used to convey data to the surface instrumentation. In the latter case, the data may be stored in a memory module (not shown in FIG. 1, but see, e.g., FIG. 7) attached to the logging tool 10 for later retrieval at the surface after the logging tool is returned to the surface. When a memory module is used, a battery supply is provided to power the module. Surrounding the well casing 14 is a cement fill 18 pumped into the bore hole to seal the well against fluids being passed along the well casing in the bore hole or becoming trapped in pockets next to the well casing. The integrity of the cement bond and the hydraulic seal provided thereby ensures that treatment fluids are positioned in the targeted regions of the formation in those applications where stimulation techniques such as fracturing are employed. A well-sealed casing can also mitigate the possible contamination of the hydrocarbons produced by the well and contamination of the formation through which the casing passes. A secondary benefit of a satisfactory cement bond is to provide mechanical support for the well casing in the bore hole.

One of the primary purposes of the cement bond logging tool is to obtain data for a log or record of the integrity of the bond between the well casing and the cement fill surrounding the casing. Cement that is well-bonded to the casing will prevent the casing from ringing like a bell, thereby damping the tendency of the casing to ring and attenuating the acoustic energy flowing within the casing. This attenuation enables the casing-conducted sound to be largely eliminated from the data sensed by the receivers. This is important because it is necessary to attenuate sound energy traveling along the well casing so that it does not interfere with the sound picked up by the receiving transducers. Cement that is not well-bonded allows this unwanted interference and also provides pockets of the bore hole that can fill with other material such as water, oil, gas, and other fluid substances that may impair the accuracy of the logging operation.

Continuing with FIG. 1, the illustrated logging tool 10 includes a transmitter section 20, a first (near) receiver section 22, generally located three feet from the transmitter section 20, and a second (far) receiver section 24, generally located five feet from the transmitter section 20 and in the same direction from the transmitter section 20 as the near receiver section 22. The near receiver 22 is generally used to provide data signals about the integrity of the cement bond to the well casing. The far receiver 24 is generally used to provide data signals about the formation surrounding the bore hole, which may include information about the cement bond with the formation. Each of the three sections 20, 22, and 24 include transducers for coupling sound energy into or from the vicinity of the logging tool 10. The relative positions of the three sections maybe inverted. In the portion of the logging tool 10 between the transmitter section 20 and the near receiver section 22 is a section often called the isolation section 26, sometimes referred to as the isolator sub (for subsection of the logging tool) or the isolator bar. The isolator section shown is one commonly in use, that lengthens the acoustic path through the body of the logging tool by an arrangement of alternating slots cut into the body of the tool, thus delaying the arrival of the sound energy traveling in the tool to minimize interference with the sound arriving at the receiver transducers via other paths of interest.

Figure 2:
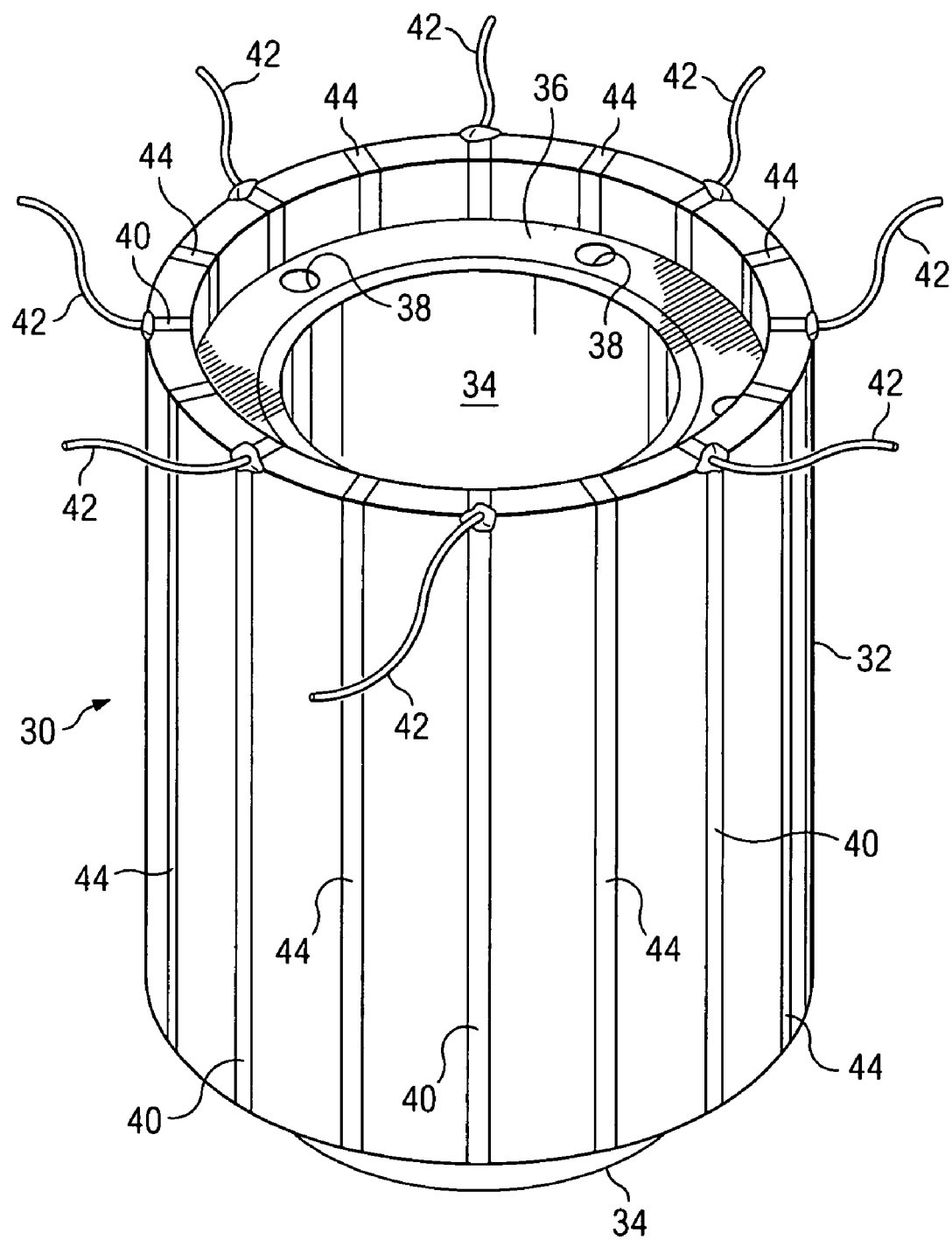
FIG. 2 illustrates a cylindrical piezoelectric transducer array configured as eight adjoining pairs of sectors, radially defined and arranged, for use in the embodiment of FIG. 1.

Referring to FIG. 2, there is illustrated a sectored cylindrical piezoelectric transducer assembly or array 30 (or, alternatively, sectored array 30) configured in this illustrative embodiment as eight adjoining pairs of sectors, radially defined and arranged, for use in the embodiment of FIG. 1. In the description herein the illustrative embodiment of a sectored transducer is shown and described having eight radial sectors, even though it is possible for the transducer to be constructed to have some number of sectors other than eight. The number eight is selected because it is a number in common use in the industry and enables comparisons of the performance of the present invention with conventional transducers. However, persons skilled in the art will readily appreciate that the principles of the present invention, insofar as they are applicable to a radially sectored transducer unit, are thus applicable regardless of the number of radial sectors employed in a particular transducer for a logging tool or other sonic energy instrument. Further, implementing transducers having other numbers of radial sectors is simply a matter of scaling the structure of the transducer and related apparatus to accommodate the different number of sectors.

An acoustic transducer of the configuration of FIG. 2 may be used in either a transmitter or receiver of a logging instrument. The transducer array 30 is formed by a single thin-walled, one-piece PZT cylinder having sixteen narrow, metallized electrode strips, each configured in the manner of a single turn loop around the cylinder wall in a direction parallel to the longitudinal axis of the cylinder at each of sixteen, equally-spaced radial increments disposed at 22.5 degree intervals around the cylinder wall. Half of the sixteen electrode strips at alternate positions spaced radially at 45 degree intervals are designated as signal electrodes 40. The remaining eight electrode strips, designated as common electrode strips 44 are also spaced radially at 45 degree intervals relative to each other, each one disposed between and parallel to a pair of signal electrodes 40, are connected together daisy-chain style by a set of jumpers (not visible in FIG. 2) within the mandrel structure to be described.

Disposed within the cylindrical PZT element 32 is a cylindrical mandrel 34 of smaller diameter than the inside diameter of the PZT element 32. The mandrel 34 may be a machined component fabricated of aluminum, for example. Between the inside wall of the PZT element 32 and the mandrel 34 is an annulus 36 of, typically, molded silicone material that further contains several passages 38, disposed parallel to the longitudinal axis of the mandrel 34 and through the wall of the annulus 36 to provide for thermal expansion of the transducer array 30.

Continuing with FIG. 2, a signal lead 42 is shown connected to alternate ones of the signal electrodes 40, typically at one end of the transducer array 30. Each signal lead 42 provides an electrical output signal corresponding to one of eight radial sectors of the transducer array 30, each radial sector in the illustrative embodiment consisting of a pair of adjacent regions demarcated around the wall of the cylindrical PZT element 32 by the signal electrodes 40. The eight signal leads 42 also correspond to one of two oppositely defined poles of the PZT element 32. The other defined pole of the transducer array 30 is defined by a set of eight common electrodes 44. Common electrodes 44 are connected inside the mandrel 34 to a sequence of jumper wires (not shown) that connect the eight common electrodes 44 (that were not connected to one of the eight signal leads 42) together. Thus, the output signal from each radial sector is provided at a signal lead 42 and the common lead 44. In practice, the eight signal leads 42 are connected to the respective inputs of eight preamplifiers in a sequence corresponding to the order of the radial sectors around the circumference of the transducer array 30.

Referring to FIG. 3A, there is illustrated a longitudinally or axially segmented cylindrical piezoelectric transducer array 50 (or, alternatively, segmented array 50) configured as four adjoining cylindrical segments, axially defined and arranged according to the present invention, for use in the embodiment of FIG. 1 or in other down-hole logging instruments requiring a high performance acoustic transducer. It is intended in the description that follows that the use of the term segmented herein refers to a cylindrical acoustic transducer that is sub-divided into axial segments—providing a sequence of adjoining rings assembled together along a common longitudinal axis, where the subdivisions are defined along planes that are perpendicular to the longitudinal axis. Thus, in FIG. 3A, there are shown four rings or segments 52 positioned adjacent each other along a common longitudinal axis of a mandrel 54 to form the segmented array 50. The four segments 52 of the segmented array 50 are preferably separated by a resilient gasket 68, such as an 0-ring, at each interface between a pair of adjacent segments 52. Although four segments are shown in FIG. 3A, the invention disclosed herein contemplates that any number of segments may be utilized, wherein each segment is operated in an anti-resonant mode.

Each of the segments 52 may be coated on its outside surface and its inside surface with a metallic coating such as silver. The metallic coating, such as typically provided by a metallized surface, provides an electrode for connecting the transducer segment to a circuit to provide for excitation or sensing of acoustic vibrations by an individual segment 52. Also shown in FIG. 3A, a common lead 62 is connected to a common jumper wire 66 that is connected to the outer surface of each of the segments 52 of the segmented array 50 at a corresponding terminal 60 disposed on the outer metallized surfaces of the segments 52. Another signal lead, common lead 64 is similarly connected inside the mandrel 54 to a sequence of jumper wires (not shown) connected to each of the inner surface electrodes of the segments 52. Further, In the embodiment of FIG. 3A, the electrodes on the outer wall of the segments defines one pole of the transducer and the electrodes deposited on the inner surface of a segment together define the opposite electric pole.

Disposed within the segmented array 50 of FIG. 3A is a cylindrical mandrel 54 of smaller diameter than the inside diameter of the segmented array 50. The mandrel 54 may be a machined component fabricated of aluminum, for example. Between the inside wall of the segmented array 50 and the mandrel 54 is an annulus 56 of, typically, molded silicone material that further contains several passages 58, disposed parallel to the longitudinal axis of the mandrel 54 and through the wall of the annulus 56 to provide for thermal expansion of the segmented array 50. The silicone annulus 56 provides a relatively solid construction of the transducer elements and the mandrel while isolating them acoustically.

Referring to FIG. 3B, there is illustrated an amplitude vs. frequency graph 72 of the responses of a typical example of a non-segmented cylindrical piezoelectric resonator 70 having a diameter of 1.50 inches and a length of 1.00 inch. The response illustrated is characteristic of one of two principle modes of vibration in a cylindrical PZT element or crystal. One of the modes is in the direction of the longitudinal axis of the cylinder form (the longitudinal mode) as the vibration wave propagates along the surface of the cylinder. The other mode is in a radial direction around the circumference of the cylinder (the circumferential mode) as the element expands and contracts radially. In FIG. 3B, resonant frequencies occur at approximate frequencies of (A) 12 KHz; (B) 26 KHz; (C) 71 KHz; and (D) 178 KHz. The frequencies at (A), (B), and (C) are believed to correspond to three different complex, longitudinally-dominant modes of vibration of this particular configuration. The frequency at (D) represents a resonance occurring in the circumferential mode and is well above the usual range of interest for use in a logging tool instrument.

Operation at around 20 KHz is favored because of the resolution it provides for these type of applications and because it is not so subject to the attenuation affects due to refraction boundaries in the well. Ideally, the transducer element would be resonant only at the band of interest. However, for small diameter tools, the transducer must necessarily be correspondingly smaller. This means that the resonant frequency of the transducer element rises and the transducer is subject to the attenuation mentioned herein above. Thus, a single, smaller transducer may become unusable. The solution provided by the present invention is to divide the cylindrical shell of the required diameter into smaller lengths or segments longitudinally and to assemble several of them together, edge-to-edge, with a resilient gasket between each adjoining segment, to bring the overall length back to that needed for sufficient acoustic output. The resilient gasket is provided to isolate the resonant response of each segment from the others. The several segments are driven in parallel when used in a transmitter, or their output signals added together when used as a receiver, to provide the needed amplitude.

Figure 3C:
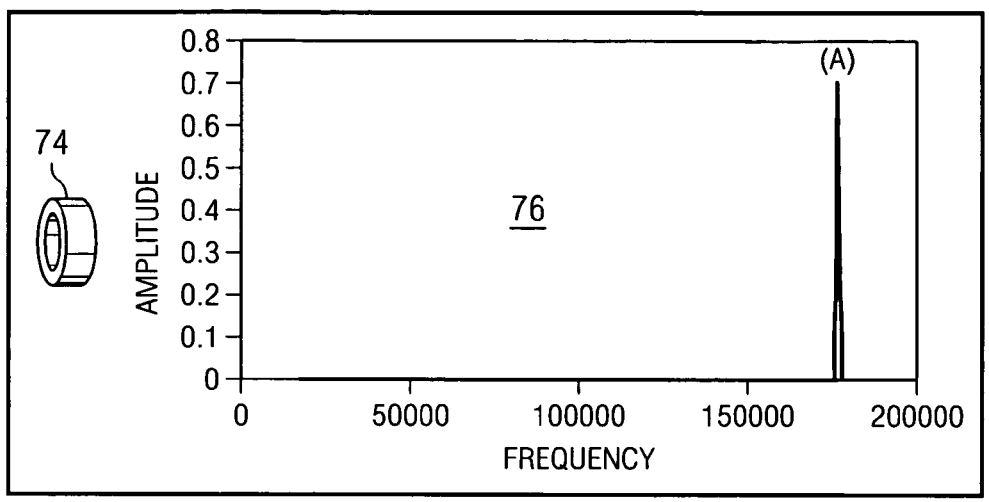
FIG. 3C illustrates an amplitude vs. frequency graph of the responses of a longitudinal segment of a cylindrical piezoelectric resonator having a diameter of 1.50 inches and a length of 0.375 inch.

Referring to FIG. 3C, there is illustrated an amplitude vs. frequency graph 76 of the responses of a longitudinal segment of a cylindrical piezoelectric resonator 74 having a diameter of 1.50 inches and a length of only 0.375 inch. From the graph, it is seen that there is a single resonant response (A) at approximately 178 KHz, that is due to the circumferential mode, lies well above the frequency range of interest, and has an amplitude equal to a fraction of the amplitude of the full length resonator. Since the lower frequency response is free of resonances, because the responses of the longitudinal modes are transposed to much higher frequencies (above the range of frequencies in FIG. 3C) as a result of the substantial shortening of the axial length of the segmented element, the segment may be driven in an anti-resonant mode at a desired frequency of, e.g., 20 KHz with no interference from other signals or "spurs." To accomplish this, several like segments are assembled together and driven or sensed in parallel, to reach sufficient amplitude. It will also be apparent to persons skilled in the art that such a segment 74 as illustrated in FIG. 3C may be operated at other frequencies in the range of the anti-resonant spectrum for the particular crystal, for example, 5 KHz to 50 KHz. Such operation at other frequencies, including operation at multiple frequencies, opens the possibilities of new measurement capabilities for down-hole instrumentation.

Figure 4:
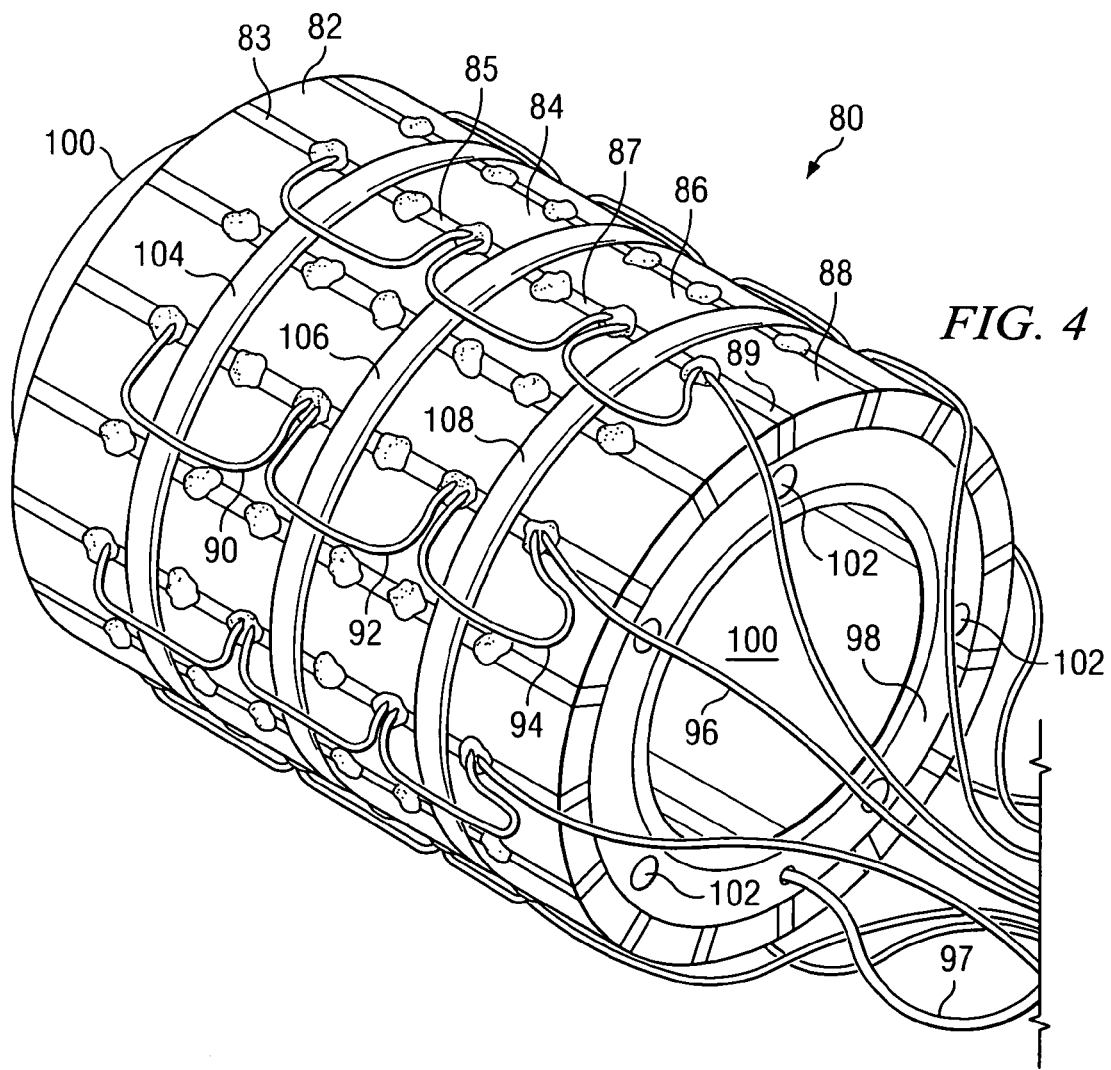
FIG. 4 illustrates a cylindrical piezoelectric transducer array configured as eight adjoining pairs of sectors, radially defined and arranged within four adjoining cylindrical segments, axially defined and arranged according to the present invention, for use in the embodiment of FIG. 1.

Referring to FIG. 4, there is illustrated a cylindrical piezoelectric transducer array configured as eight adjoining pairs of sectors, radially defined and arranged within four adjoining cylindrical segments, axially defined and arranged according to the present invention, for use in the embodiment of FIG. 1. The composite array 80 is assembled of four individual segments 82, 84, 86, and 88, stacked edge-to-edge along a common longitudinal axis with resilient gaskets such as O rings 104, 106, and 108 placed between adjacent segments. Thus, segments 82 and 84 are separated by a resilient gasket 104, segments 84 and 86 are separated by a resilient gasket 106, and the segments 86 and 88 are separated by the resilient gasket 108.

Further, each of the segments 82, 84, 86, 88 includes sixteen metallized electrodes represented by the respective electrodes 83, 85, 87, and 89 that encircle the segment at equal 22.5 degree angles around the circumference of the segment in the same manner as the electrodes 40 and 44 in FIG. 2 described herein above. Each alternate pair of signal electrodes around each segment defines a sector that includes the portion of the PZT shell between the electrodes. The electrode between each alternate pair of signal electrodes is defined as a common electrode for the particular sector. The segments are assembled so that the electrodes are aligned in the direction of the longitudinal axis and connected together by a series of leads. For example, a representative lead 90 connects between the aligned electrodes of adjoining segments 82 and 84. Similarly, a lead 92 connects between the aligned electrodes of adjoining segments 84 and 86. Similarly, a lead 94 connects between the aligned electrodes of adjoining segments 86 and 88. Finally, a signal lead 96 connects the aligned electrodes to an external circuit, which may be the output of a transmitter driver to be described or the input of a receiver circuit to be described. This same arrangement of connected electrodes and leads is utilized around the circumference of the transducer for each of the eight sectors. The signal leads 96 (there will be eight of them, one for each sector, which may be color coded) may typically be bundled together into a harness or cable (not shown). Along with the eight signal leads 96 there will be a common lead or leads 97 that connect(s) together each of the common electrodes located between each of the signal electrodes of each sector, and which are further connected serially with the aligned common electrodes of the adjoining segments to a common terminal of the respective circuit coupled with the transducer's composite array 80. The connection of the individual common leads of each of the sectors and segments may be configured like the configuration of the signal leads 90, 92, 94, and 96 but is not shown in FIG. 4 for clarity, it being readily understood by persons skilled in the art how such connections would be implemented.

Continuing with FIG. 4, the internal construction of the composite array 80 is similar to that of the transducers illustrated in FIGS. 2 and 3A. Disposed within the cylindrical PZT segments 82, 84, 86, and 88 of the composite array 80 is a cylindrical mandrel 100 of smaller diameter than the inside diameter of the cylindrical PZT segments 82, 84, 86, and 88. The mandrel 100 may be a machined component fabricated of aluminum, for example. Between the inside wall of the cylindrical PZT segments 82, 84, 86, and 88 and the mandrel 100 is an annulus 98 of, typically, molded silicone material that further contains several passages 102, disposed parallel to the longitudinal axis of the mandrel 100 and through the wall of the annulus 98 to provide for thermal expansion of the transducer composite array 80. The silicone annulus 98 provides a relatively solid construction of the transducer elements and the mandrel while isolating them acoustically.

Figure 5A:
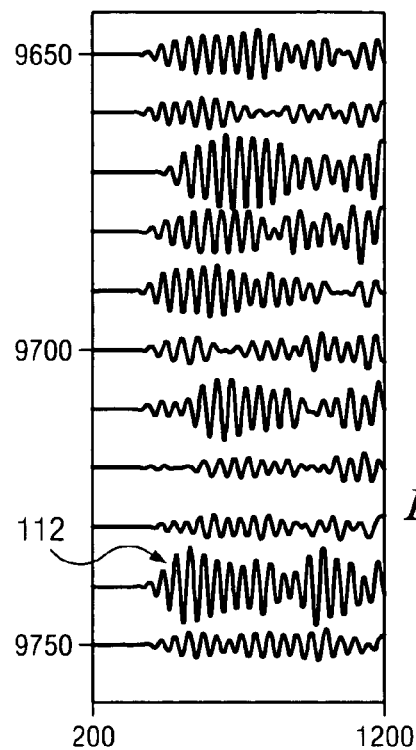
FIGS. 5A and 5B illustrate a comparison of an output waveform of a segmented transducer (FIG. 5A) according to the present invention as shown in the embodiment of FIG. 3A, with a conventional prior art non-segmented transducer (FIG. 5B)
Figure 5B:
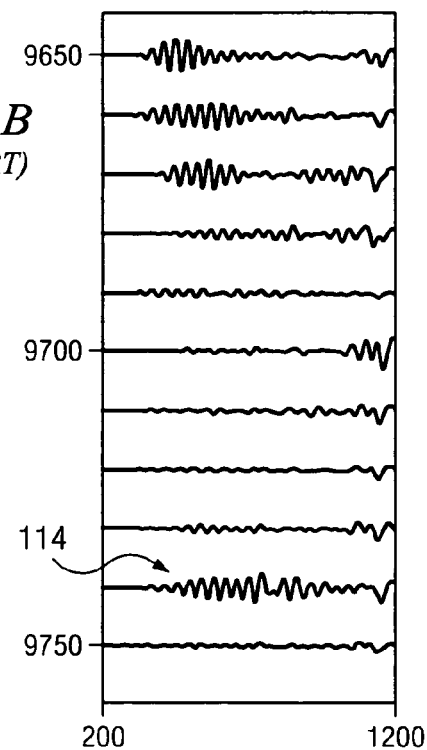

Referring to FIGS. 5A and 5B, there is illustrated a comparison of the output waveforms of a segmented transducer according to the present invention, such as the embodiment shown in FIG. 3A (See the waveforms of FIG. 5A) with a conventional non-segmented transducer (See the waveforms of FIG. 5B). The waveforms appearing in FIGS. 5A and 5B are commonly known as "X-Y displays." The waveform 112 shown in FIG. 5A is a voltage vs. time graph of the output signal of a receiving transducer corresponding to the acoustic signal sensed by the transducer at a depth of 9740 feet in this example. The signals shown in FIG. 5A represent the outputs of the transducer at various depths in the well between 9650 feet and 9750 feet. As is evident in the figure, the signals are characterized by a high degree of clarity, substantial amplitude, and a minimum of noise.

In contrast, the waveforms illustrated in FIG. 5B for the conventional non-segmented transducer display signals that while apparently clear, are characterized by low or insufficient amplitude, as plotted on the same scale is the waveforms of FIG. 5A. Further, the waveforms of FIG. 5B are taken under identical conditions and depths as those in FIG. 5A. The noise levels in both cases is low, in order to provide a valid comparison of the relative amplitudes. Thus waveform 114 in FIG. 5B has an amplitude substantially smaller than the corresponding waveform 112 in FIG. 5B. In the presence of electrical noise often present on the wire line, and the "road noise" typically encountered by the instrumentation as it is pulled upward through the well casing during down hole logging operations, such weak signals may be masked, easily distorted, or otherwise unresolvable with satisfactory accuracy. A more graphic illustration of the same comparison is shown in FIGS. 6A and 6B, which present the same data in a different form.

Figure 6A:
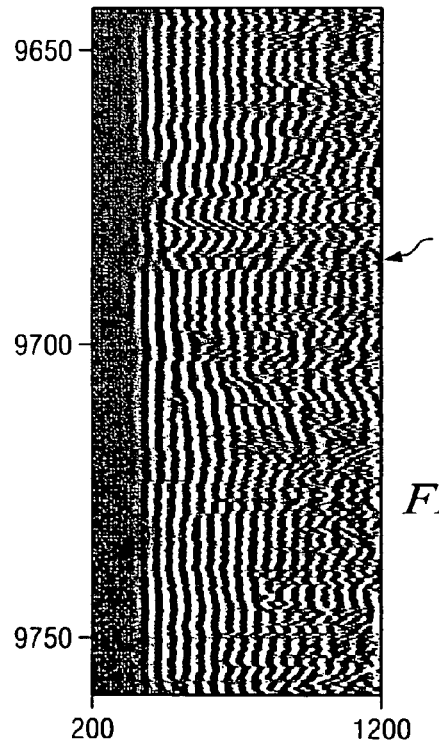
FIGS. 6A and 6B illustrate a comparison of a Variable Density Log (VDL) of the output waveform of a segmented transducer according to the present invention (FIG. 6A), with the VDL of a conventional prior art non-segmented transducer (FIG. 6B)
Figure 6B:
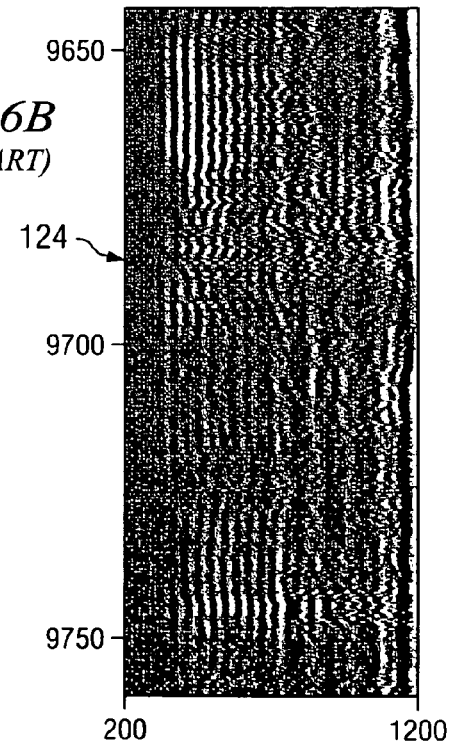

Referring to FIGS. 6A and 6B, there is illustrated a comparison of a Variable Density Log (VDL) of the output waveform of a segmented transducer according to the present invention (See FIG. 6A), with the VDL of the conventional non-segmented transducer (See FIG. 6B), wherein the VDLs of FIGS. 6A and 6B correspond to the respective output waveforms of FIGS. 5A and 5B. As previously stated, these graphical images are derived from the same acoustic signals as the waveforms in FIGS. 5A and 5B, the difference being that the data is merely displayed differently. As is well known, a VDL plot is the result of several processing steps, which essentially consist of utilizing the positive peak values of the signal from the transducer (i.e., the X-Y signals) to intensity modulate a bar-graph like display. Thus, the positive peaks are clipped from the signal waveform and appear as dark bars on a lighter background. The lighter background represents the positions of the intervening negative peaks. The resulting display, called a microseismogram, provides a graphic image of the acoustic signal representing conditions next to the well casing. The detailed interpretation of these VDL images is beyond the scope of this description (but see also FIG. 14 and the description thereof), it being sufficient in this example for the reader to note the very clear difference in the quality and definition of the displayed image that results from the difference in the type of acoustic transducer used in the logging instrument.

Referring to FIG. 7, there is illustrated a block diagram of the signal processing system provided for the piezoelectric transducers according to embodiments of the present invention. In FIG. 7 various signal paths will be identified connecting or coupling various portions of the system together. These signal paths may contain one or more distinct conductors depending on the particular signals being conveyed. For example, a drive signal may require only one signal conductor and one return conductor. Conversely, a 14 bit data signal may require a 14-conductor bus to convey the data signal. Persons skilled in the electronic arts will readily recognize the configuration represented by the single lines identified in FIG. 7 and described herein as sometimes referring to multiple conductor "signal lines." The signal processing system 130 includes a control board 132, coupled to a transmitter board 134 via firing control signal paths 136, to control the frequency of the drive signal provided to the transmitting transducer, and 138, to control the repetition rate of the drive signal. The transmitter board includes a pulse generator to develop the drive signal and a transducer driver to interface between the pulse generator and the transmitter transducer 140 via a signal line 142. The transmitter board 134 and the control board 132 will be further described with FIGS. 8 and 9 respectively herein below.

Continuing with FIG. 7, a receiver 144, illustrated therein as a near receiver 144 is coupled to a receiver board 146 via a signal path 148. Signals from the transducer coupled to the receiver 144 are amplified and filtered prior to outputting them to the control board 132 via a signal path 150. The received signals are sampled, digitized, and stored in memory in the circuitry of the control board 132. Prior to being sent to a line driver 152 via path 154, the stored signal data may be normalized using calibration data stored in the CBL tool memory, and, if it is to be transmitted up the wire line 158, converted to analog form, and amplified. The line driver 152 further amplifies and conditions the signals for transmission on the wire line 158 to the surface instruments 156. In an alternate embodiment, if the data is not to transmitted up the supporting line, i.e., to the "slickline" via line 157, it may stored in digital form in non-volatile memory in a memory module 153 via a line 155, to be retrieved at a later time. Also, in the alternate embodiment, a battery power supply (not shown) is provided to accompany the memory module 153. The signal processing circuitry and functions will be further described with FIG. 9 herein below.

Figure 8:
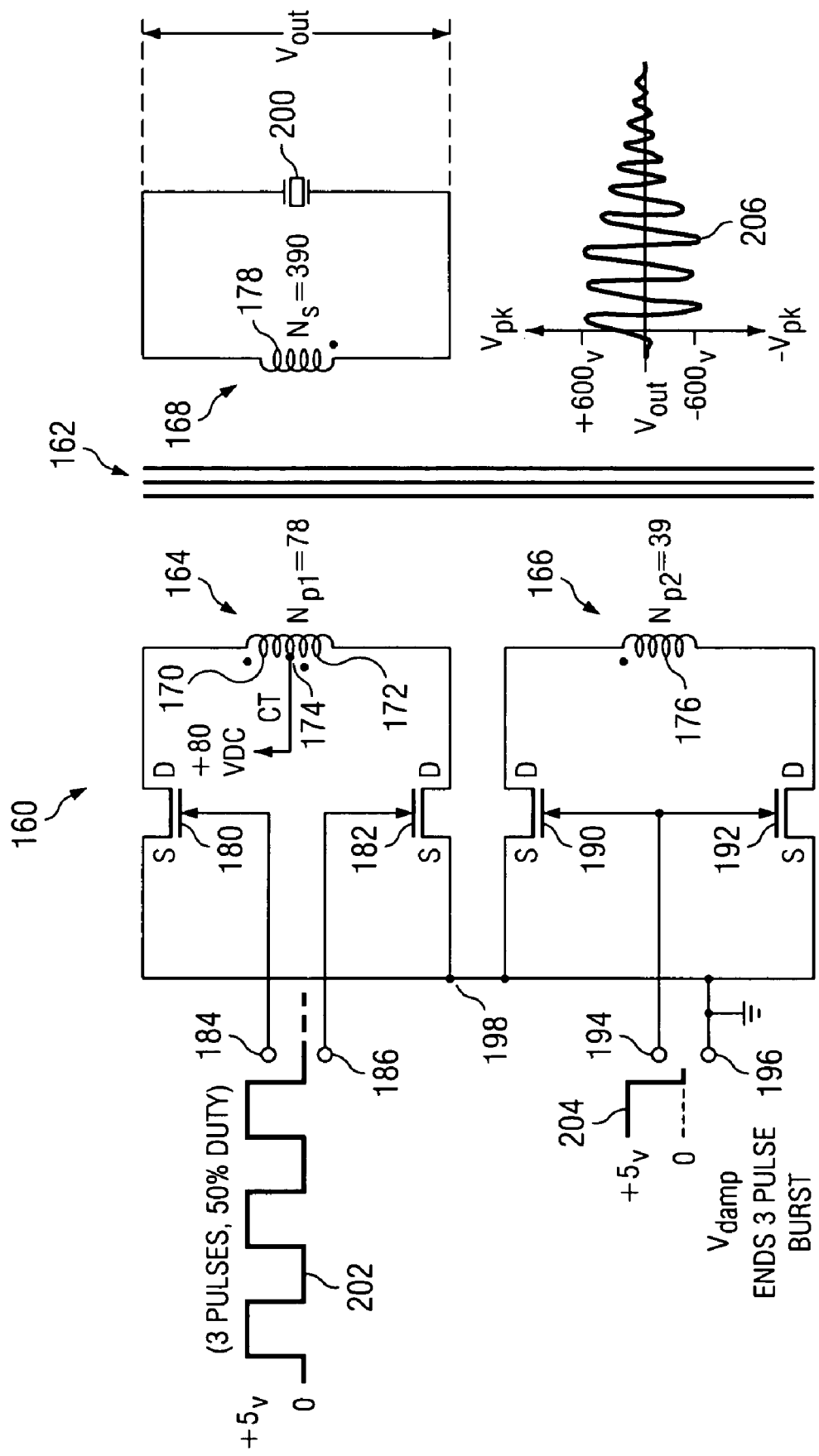
FIG. 8 illustrates a simplified schematic diagram of the transmitter board portion of the block diagram of FIG. 7.

Referring to FIG. 8, there is illustrated a simplified schematic diagram of the transmitter board portion of the block diagram of FIG. 7. The transmitter board 134 (FIG. 7) includes a transmitter driver circuit 160 constructed as a step up transformer 162 having first 164 and second 166 primary windings, each connected to a circuit configured with a pair of MOSFET transistors driven by signals controlled by the control board 132. A secondary winding 168 couples the output transmitter driver signal 206 to the transducer portion 200 of the transmitter 160. The transducer portion 200 of the transmitter 160 is represented by the symbol for a crystal, herein above described as a piezoelectric ceramic element. The first primary winding 164, in the illustrative embodiment is formed of 78 turns and is center tapped at a node 174, forming first 170 and second 172 halves of the primary winding. The center tap node 174 is connected to a +80 Volt DC supply voltage to provide operating current for the drive circuit. The drain terminals of first 180 and second 182 MOSFET transistors, both N-type, are connected respectively to the ends of the first 170 and second 172 halves of the primary winding 164 that are opposite the center tap node 174. The source terminals of both transistors 180 and 182 are connected to a common terminal 198, which is connected to the ground side of the circuit.

The input signal Vin 202 coupled to the transmitter driver circuit 160 in FIG. 8 is applied to first 184 and second 186 terminals, respectively coupled to the gate terminals of the first 180 and second 182 transistors. Vin 202 may be, in the illustrative embodiment, a square wave signal having a 50% duty cycle and a peak-to-peak voltage value of five Volts. The drive signal Vin 202 is specifically configured in this example as having three consecutive cycles of the driving frequency, which in this embodiment is selected at 20 Khz. Thus, each pulse cycle has a duration of 50 microseconds (usec) and each pulse portion of the signal has a duration of 25 usec. The action of the Transmitter driver circuit is to alternately cause the first 170 and second 172 halves of the primary winding 164 to conduct a substantial current change in the respective half of the primary winding 170 or 172, resulting in a replica of the current in the secondary winding 168. The voltage appearing across the secondary winding 168 is stepped up according to the ratio of the number of turns in the secondary winding 168 to the number of turns in the first primary winding. In this illustrative example, the turns ratio of the secondary winding 168 to each of the first primary windings 170 or 172 is 390 turns to 39 turns, or, 10-to-1, at any given instant because at each instant, only half of the first primary winding 164 is conducting current, since one of the transistors 180, 182 is not conducting.

The transmitter driver circuit 160 includes a clamping circuit that utilizes the second primary 166 to inhibit the drive current in the first primary 164 when it is not necessary to provide a drive signal to the transformer. It will be recalled that the drive signal burst is issued to the transducer at 50 millisecond (msec) intervals, that is, at a 20 Hz repetition rate. Three cycles of the drive signal Vin 202 take only 150 usec of time. The rest of the synchronization cycle time, 49.85 msec, the transmitter is required to be idle. To ensure that this condition is satisfied in the transmitter, a clamping signal, called Vdamp 204 is applied to the second primary winding 166 of the transformer 162. The second primary winding 166, in the illustrative embodiment is formed of 39 turns. The drain terminals of the third 190 and fourth 192 MOSFET transistors, both N-type, are connected respectively to the ends of the primary winding 166. The source terminals of both transistors 190 and 192 are connected to a common terminal 198, which is connected to the ground side of the circuit.

A clamp signal Vdamp 204 coupled to the clamp circuit portion of the transmitter driver circuit 160 in FIG. 8 is applied to third 194 and fourth 196 terminals, respectively coupled to the gate terminals of the third 190 and fourth 192 transistors. The Vdamp 204 signal, applies a falling edge at the instant the third cycle of the Vin signal 202 burst is required to end, i.e., 150 usec after the first rising edge of the Vin signal 202 is applied to the first 184 and second 186 terminals. Thus, the Vdamp signal 204 ensures that the current in the first primary 164 is forced to zero by the counter action of the opposite polarity of the damping current in the second primary 166. By the action of the step up transformer, the transmitter driver signal applied to the transducer 200 is the signal Vout 206, shown in FIG. 8 as an oscillatory waveform of the same frequency as the input burst, Vin. The amplitude of Vout is sustained at approximately 1200 Volts peak-to-peak for approximately three cycles (150 usec) before decaying toward zero. The Vout=1200 Volts p-p corresponds to approximately 30 joules energy in the illustrative embodiment and is sufficient to drive the transducer portion of the transmitter, wherein the transducer employs the segmented construction according to the present invention.

Figure 9:
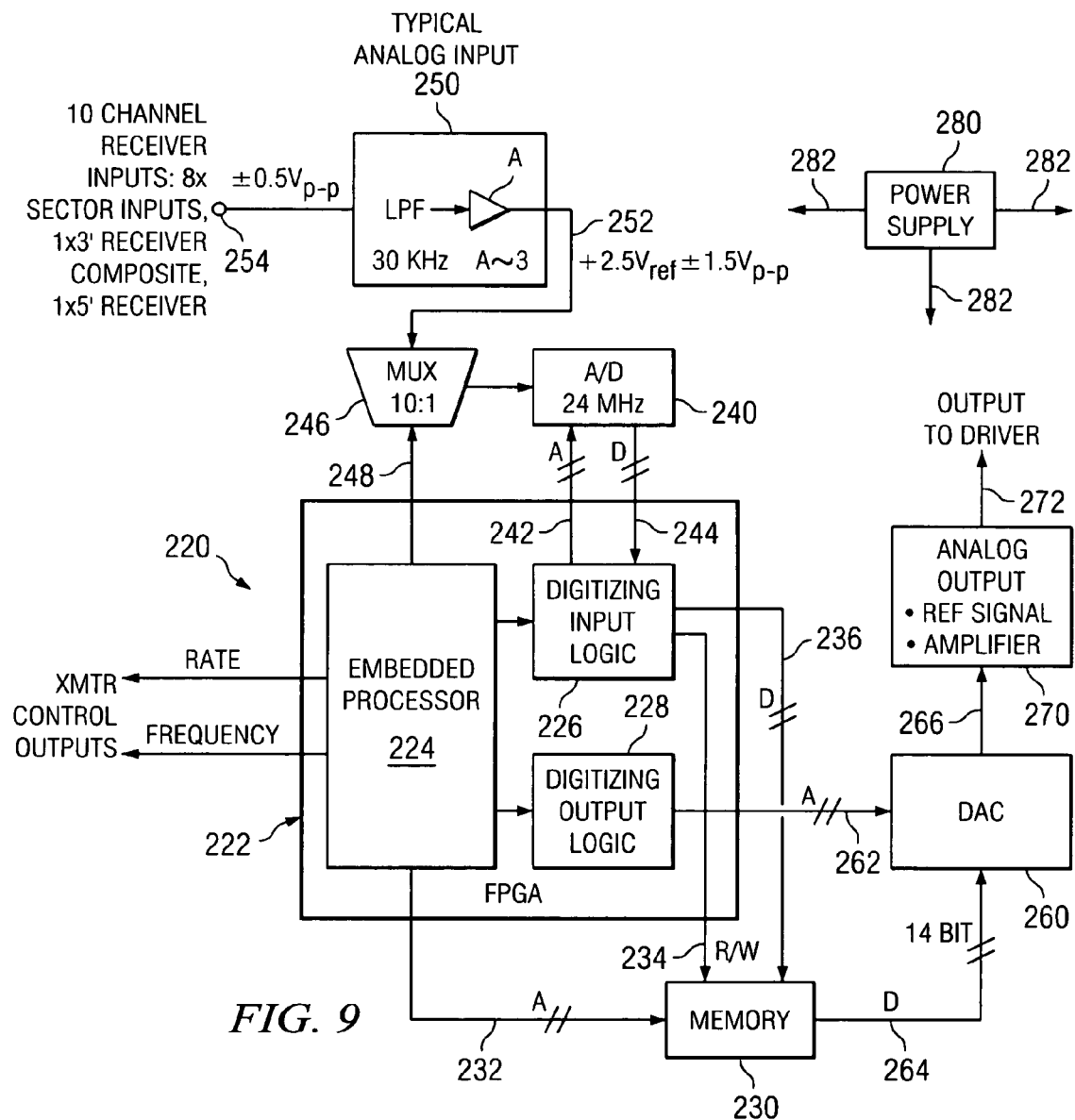
FIG. 9 illustrates a block diagram of the control board portion of the block diagram of FIG. 7.

Referring to FIG. 9, there is illustrated a block diagram of the control board portion of the block diagram of FIG. 7. The control board 220 (shown as control board 132 in FIG. 7) includes in the illustrative embodiment a programmable system on a chip (PSOC) that preferably includes a field programmable gate array 222 (FPGA 222) therewithin having an embedded processor 224. The FPGA 222 is configured to provide digitizing input logic 226 and digitizing output logic 228. Thus, the FPGA 222 should include sufficient logic elements, embedded memory and the capability to interface with a variety of I/O requirements in a wide variety of applications that must operate in severe environmental conditions. The embedded processor 224 within the FPGA 222 is configured to provide all of the necessary control programming of the functions performed in the acoustic instrumentation portions of the cement bond logging (CBL) tool 10, including the aforementioned transmitter control signals for the frequency and rate of the drive signals applied to the transmitting transducer (See FIGS. 7 and 8 and the accompanying detailed description). The embedded processor 224 is further configured to interface with external memory 230 via the bus 232 and with the 10:1 multiplexer (MUX) 246 via the line 248.

The embedded processor 224 also provides control for digitizing input logic 226 and digitizing output logic 228. The digitizing input logic 226, which may operate up to 24 MHz in the illustrative embodiment, interacts with an analog-to-digital converter (A/D) 240 via address 242 and data 244 lines. The digitizing input logic 226 further interacts with the external memory 230 via a read/write line (RIW) 234 and a data bus 236, and receives analog signal inputs from the 10:1 MUX 246. The MUX 246 receives the amplified receiving transducer signals from the CBL tool 10 and distributes them to the A/D 240 for sampling and digitizing prior to storage in the external memory 230.

Inputs to the analog input section 250 at terminal 254 include the signals from ten channel inputs: eight from the individual sectors of the near (3') receiver 22, one composite signal from the near (3') receiver 22 itself, and one input from the far (3') receiver 24. In this embodiment, only ten of the available twelve channels are used. Referring back to FIG. 1, the 3' receiver 22 and the 3' receiver 24 are shown in their relative positions in the cement bond logging tool 10. The arriving signals typically have an amplitude of +/−0.5 Volts peak-to-peak (0.5 Vp-p) and, after passing through a low pass filter having a 30 KHz cut-off frequency in this illustrative embodiment, are amplified in a preamplifier section of the analog input 250 to a swing of +/−1.5 Vp-p and transposed to a reference level of approximately +2.5 V DC. In the preamplifier section of the analog input 250, the nominal gain applied to the signals is approximately A=3. However, this gain value is a typical value for purpose of illustration and actual systems may differ depending upon the design and intended application.

The A/D 240 in the illustrative embodiment operates at a frequency of 24 MHz and is configured to digitize twelve arriving input channels at a sampling rate of 12 MHz. Thus, each channel is sampled and digitized at a 1.0 MHz rate, i.e., 1.0 usec per sample. In the system illustrated herein, each waveform is sampled 250 times—digitizing approximately five cycles of a 20 KHz signal. If eight sector signals are digitized, the total time required is 8×250 usec=2000 usec=2.0 millisec. Further, 1100 usec are allocated to digitize the outputs of each of the 3' and 3' receivers. Thus, the total time to sample and digitize the ten channels of information (note that two channels are not used in this illustrative example) during each 50 millisecond processing cycle is approximately 4200 usec or 4.20 milliseconds. At the nominal transmitter firing rate of 20 Hz, this represents a small fraction of the time available in each 50 msec., 20 Hz cycle. This 'unused' available time is then available for performing other signal processing operations in the CBL tool 10.

Continuing with FIG. 9, the digitized signals from the A/D are stored in the memory 230 in time-mapped locations to await further signal processing prior to transmitting the data to the surface. The additional signal processing maybe performed, for example, to normalize the data using calibration factors stored in the memory 230 during manufacture of the cement bond logging tool 10. The processes for performing the normalization will be described herein below with FIG. 10. During operation of the CBL tool 10, the digitizing output logic, according to addresses transmitted along the address bus 262, controls retrieving of the data from the memory 230 via a 14 bit data bus 264, transferring it to the digital-to-analog controller (DAC) 260. Analog signals from the output of the DAC 260 are coupled along a signal line 266 to an analog output section 270. In the analog output section 270, the analog signals are adjusted to a reference level and amplified to condition the signals for being coupled to the wire line 12 by a line driver stage (e.g., 152 in FIG. 7). In an alternate embodiment, the data may be retrieved from memory 230 and transferred in digital form to a memory module (not shown in FIG. 9, but see FIG. 7 and the accompanying description herein above). In this alternate embodiment, which is suited for use with logging tools supported by the well-known "slickline," the data is held in the memory module for later retrieval. Also shown in FIG. 9 is a power supply 280 for providing operating voltages over lines 282 to various functional sections of the acoustic instrumentation within the CBL tool 10.

Referring to FIG. 10, there is illustrated a flow chart of one embodiment of a process for normalizing a cement logging tool according to the present invention for use in the system of FIG. 7 using a segmented transducer such as shown in FIG. 3A. In this normalization process, the digital gain factor Fc will be calculated for each of the ten channels of the present illustrative embodiment for receiving input signals from the acoustic receiving transducers. In a CBL tool using acoustic transducers several kinds of variables can affect the acoustic signals being transmitted, conducted, reflected, refracted and received in the structure of the CBL tool itself, the fluid within the well casing, the well casing, the cement within the bore hole between the well casing and the formation, and the formation penetrated by the bore hole.

In order to ensure that the information conveyed by the acoustic signals received by the receiving transducers is referenced to standard conditions in the CBL tool, the digitized signals are normalized in the signal processing circuitry of the CBL tool as embodied in the present invention. The normalization that is performed during operation of the CBL tool is carried out using calibration factors derived during operation of the CBL tool under free pipe conditions. The calibration factors are obtained during execution of the normalization program illustrated in FIG. 10, after initializing the circuitry in the CBL tool under free pipe conditions. Free pipe conditions are simulated, before shipment of the tool to a customer, by placing the CBL tool in a section of well casing, centralizing the CBL tool body within the well casing, and filling the section of well casing with a fluid, e.g., water, under pressure. The tool is brought to operating temperature, the transmitter is excited, the tool placed in a calibration mode, and the digital gain of the digitizing circuitry for the receiver preamplifiers individually adjusted under to a reference value for each channel. This normalization process is accomplished under program control by the high speed signal processing within the CBL tool, takes only a few seconds, and can be accessed at any time to calibrate the CBL tool or for verification by the surface operator in seconds, whether the CBL tool is suspended by the wire line at the surface or within the well casing at any depth.

Continuing with FIG. 10, the normalization process begins at a start block 300, followed by step 302 to set a jumper to an ON position to place the logging tool into the calibration mode and power up the logging tool. In the next step 304, drive is enabled to energize the transmitter, the normalization run is set for 100 cycles or repetitions, and the channel number "m" is set to m=1. In step 306, a pre-acceptance threshold (See the detailed description of FIG. 14, infra, for further explanation of a pre-acceptance threshold) is set at an appropriate level above the noise, as a reference level for recognizing an acceptable positive signal output from a segmented receiving transducer or transducer sector. The steps 302 through 306 together accomplish the initialization of the circuitry in the logging tool.

In step 308, the execution portion of the normalization process is begun, wherein the signal is tracked, sampled at the sampling rate of 1.0 MHz (12.0 MHz divided by 12 channels) and digitized. The digitized value of the positive peak is then stored in the memory of the logging tool signal processing circuitry. The step 308 is repeated a predetermined number of times; in the illustrative example, it is repeated 80 times in step 310. The predetermined number may be at least a majority of the number of firing cycles or repetitions to which the transmitter is set to be energized. Then, in step 312, the stored peak values are sorted to provide a representative number of samples, eliminating the 20 lowest values and the 20 highest values. In the present example, the number of values to be eliminated is set to 25 percent of the number of repetitions of the digitizing step. The remaining 40 values, the representative samples, are averaged in step 314, and the average value set equal to "N" and stored in time-mapped locations in memory. The value "N" is the normalized peak value for the particular channel "m" in the particular tool being calibrated.

In the following decision step 318, a query expressed as 12−m=0? is evaluated, and if the result is negative, the flow enters step 316. Steps 308 through 314 are then repeated in step 316 for the next channel, i.e., for m=m+1, and the flow of the process returns to begin again with step 304. If, however, the result of the query in step 318 is affirmative, the flow advances to step 320. In step 320, a "standard" Vin value (signifying the value of the input voltages to the surface instrumentation) is selected and designated as "Vin,std." This operation is performed, and the digital gain adjusted, so that all of the channels can be operated to the same baseline, i.e., have the same offset adjusted approximately to a zero value. The "zero" value corresponds to a baseline defined as: ½(Vpk-pk) for each of the channel signals. For the purposes of this description, the selected value for Vin,std may be 4.0 Volts. This value is somewhat arbitrary, but is chosen to be large enough to survive transmission up the sometimes very long wire line (unless the logging tool is configured for use with a slickline, in which case this limitation is not applicable), yet without causing the output driver to exceed its maximum peak-to-peak voltage swing. In various applications, this value maybe selected at other voltages, depending on the application.

Following selection of the value for Vin,std, step 322 performs the calculation of a digital gain factor Fc=Vin,std divided by N for each of the twelve channels, using the time-mapped values for N that are associated with each channel m=1, 2, . . . 12. Next, in step 324, the values for Fc for all of the channels are stored in memory in the CBL tool. These digital gain factors are then available for use anytime the CBL tool of the present invention is placed into the calibration mode. After the digital gain factors Fc are stored, the normalization routine is completed and may be exited in step 326 by restoring the normalization mode jumper to its OFF position.

Figure 11A:
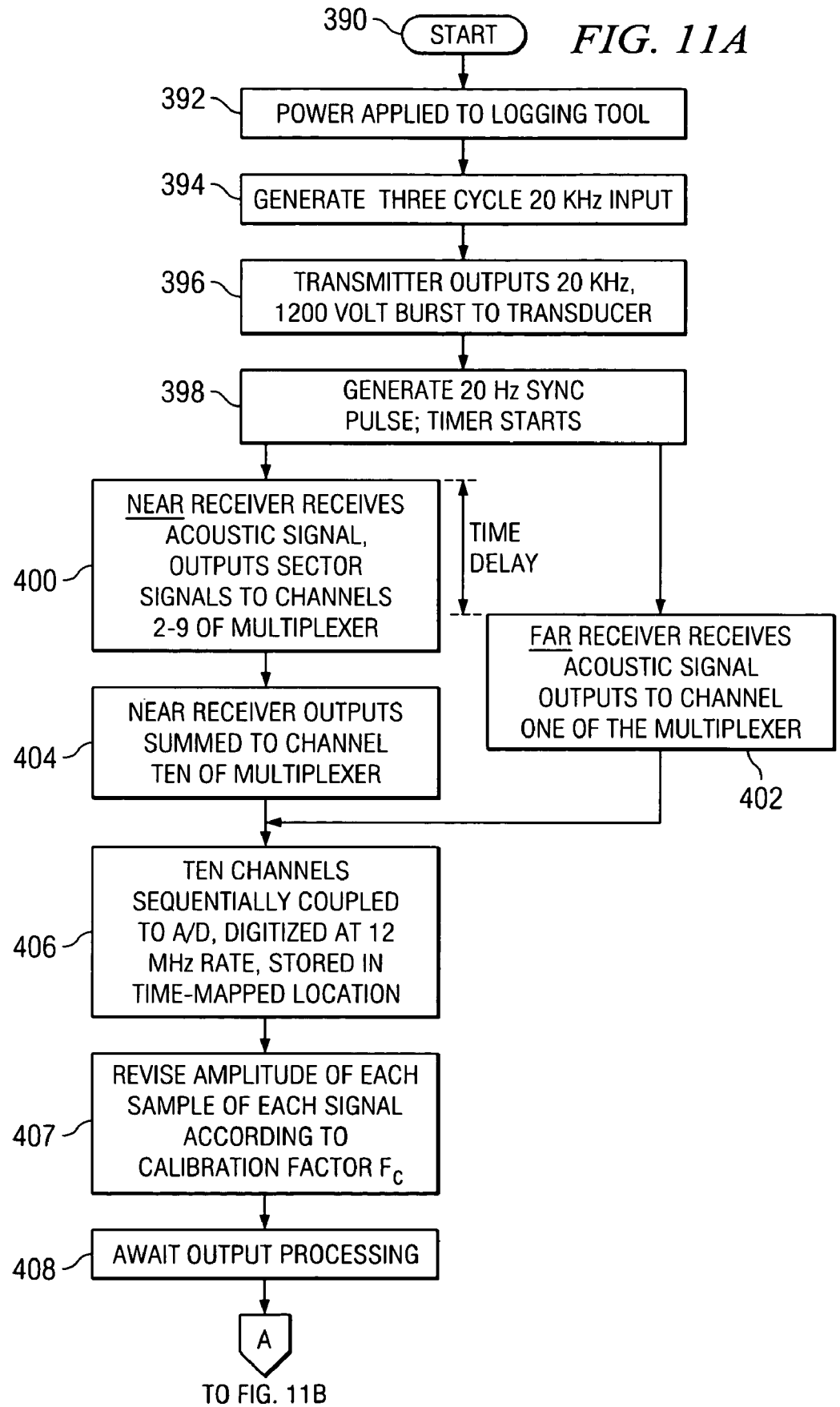
FIGS. 11A and 11B illustrate a flow chart of one embodiment of a signal processing method according to the present invention for use in the system of FIG. 6 using the transducer of FIG. 3A.
Figure 11B:
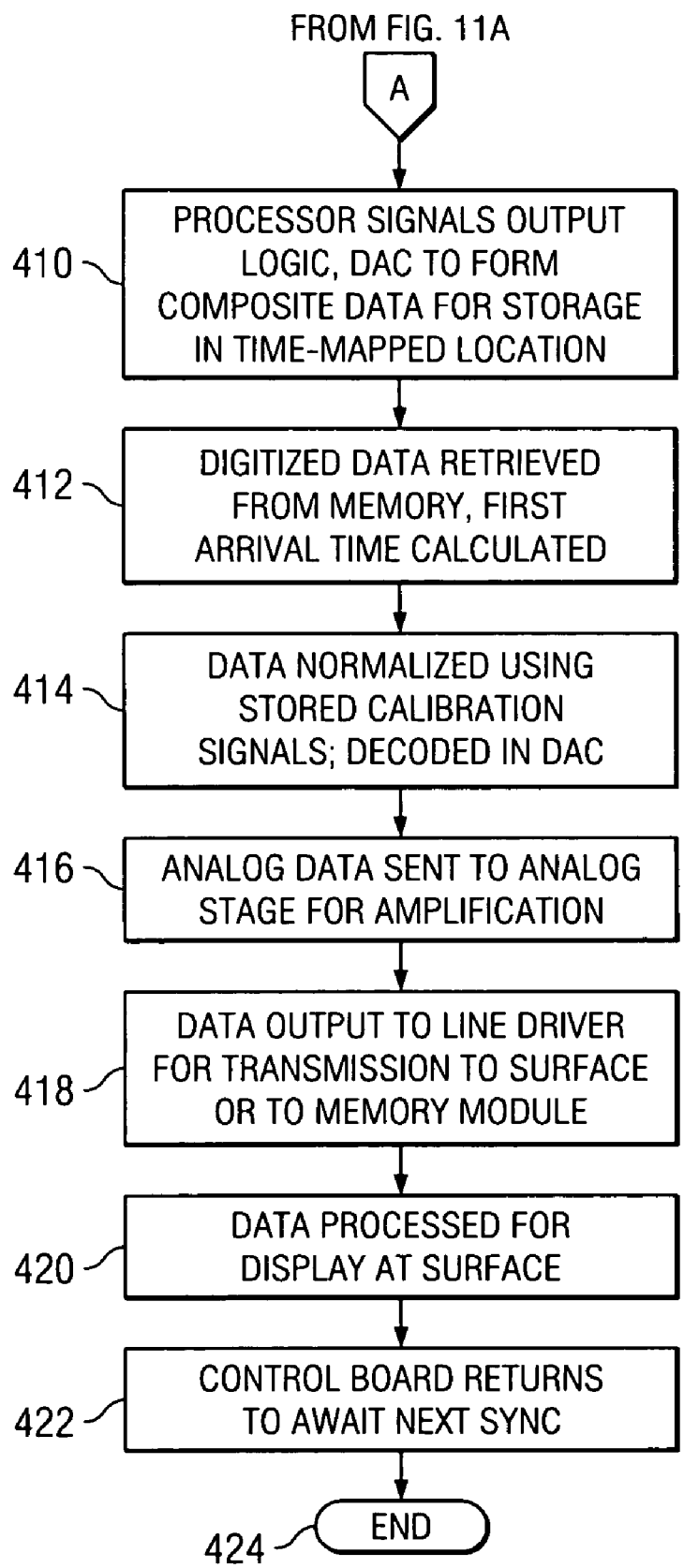

Referring to FIGS. 11A and 11B, there is illustrated a flow chart of one embodiment of a signal processing method according to the present invention for use in the system of FIG. 7 using the transducer of FIG. 3A. Following the start block 390, power is applied in step 392 to the CBL tool 10, and the calibration waveforms stored in the tool memory are transmitted to the surface for display, enabling the operator to calibrate the surface instrumentation by setting the gain reference for all of the signals received to a known value, e.g., 0.50 Volts. This calibration is performed to normalize the tool to the operating depth (i.e., the length of the wire line, in the case where the data is transmitted up the wire line) and other variables of the individual site. Applying power also enables the transmitter board (See FIG. 8 described supra) to generate a plurality of 20 KHz excitation pulses in step 394 to drive the transmitter. In the illustrative embodiment, three cycles of the 20 KHz square wave signal have been found sufficient through experimentation to adequately excite the transmitting transducer, causing it to output a wave train having approximately three cycles of a 20 KHz acoustic signal before becoming damped by the mechanical losses in the transducer crystal material and decaying to zero. The transmitter circuit, upon receiving the three-pulse input at step 396 responds by outputting a 20 KHz, 1200 Volt peak-to-peak signal, which is applied across the transducer, exciting it to oscillate at the 20 KHz frequency in its anti-resonant mode. At approximately 200 microseconds (usec) after the beginning of the three cycle excitation pulse train, step 398 starts a timer and causes the generation of a 20 Hz synchronization pulse to be used by the surface instrumentation. As will be observed in FIG. 14 to be described, transmission of the sync pulse is delayed a sufficient amount of time following the three-cycle excitation burst to ensure that the sync signal is unaffected by the burst signal. The sequence of acoustic signals, beginning with the transmitting transducer sending the 20 KHz signal into the surroundings, will be illustrated in FIGS. 12 through 14 and the accompanying description.

Continuing with FIG. 11A, following the generation of the 20 Hz sync pulse, the near (3') receiver 22 (See FIG. 1) receives the acoustic signals traveling through the bore hole and the adjacent lithography formation in step 400, and responds by outputting corresponding electrical signals from each of the eight sectors of the receiving transducer. These eight signals are coupled into channels 2 through 9 of the multiplexer 246 in the control board portion 220 (See FIG. 9) of the signal processing section of the CBL tool 10 (See FIG. 1). Approximately 100 microseconds later (the amount of the time delay, represented in FIG. 11A, is variable, depending upon the particular logging conditions and activity), the far (5') receiver 24 receives acoustic signals in step 402 that result from the same transmitted burst but having traveled farther through the bore hole and the adjacent lithography. The far receiver output signal is coupled to channel one of the multiplexer 246. Meanwhile, during the processing of the eight sector outputs of the near receiver, the highest peak values of the waveforms from each of the eight receiver sectors are summed in step 404 and coupled to channel ten of the multiplexer 246. The inputs to the ten channels of the multiplexer 246 are sequentially coupled to the A/D in step 406, digitized in sequence at a 12 MHz rate, and stored in a time-mapped location in memory. In the following step 407, the amplitude of each sample of each signal is revised according to the calibration factor Fc that was calculated during the normalization of the CBL tool, as described with FIG. 10. The processing is momentarily idle at this point (step 408) as it awaits the next step instruction from the embedded processor on the control board 220.

Referring to FIG. 11B, which is a continuation of step 11A, the embedded processor 224 on the control board 220 signals the output logic and the DAC 260 to form composite data for storage in another time-mapped memory location in step 410. This composite data is the digital data that represents the type of signals illustrated in FIG. 13 (to be described), which in turn represent the acoustic signals that convey information about the effects that the structures of the well and the surrounding lithography have imprinted in the acoustic signals. One important piece of data embodied in the data is the "first arrival time," which records the first instant, relative to the sync pulse, that the first positive portion of the signal of interest—an individual sector signal, a composite near receiver signal, or a far receiver signal—reaches its peak value.

Figure 13:
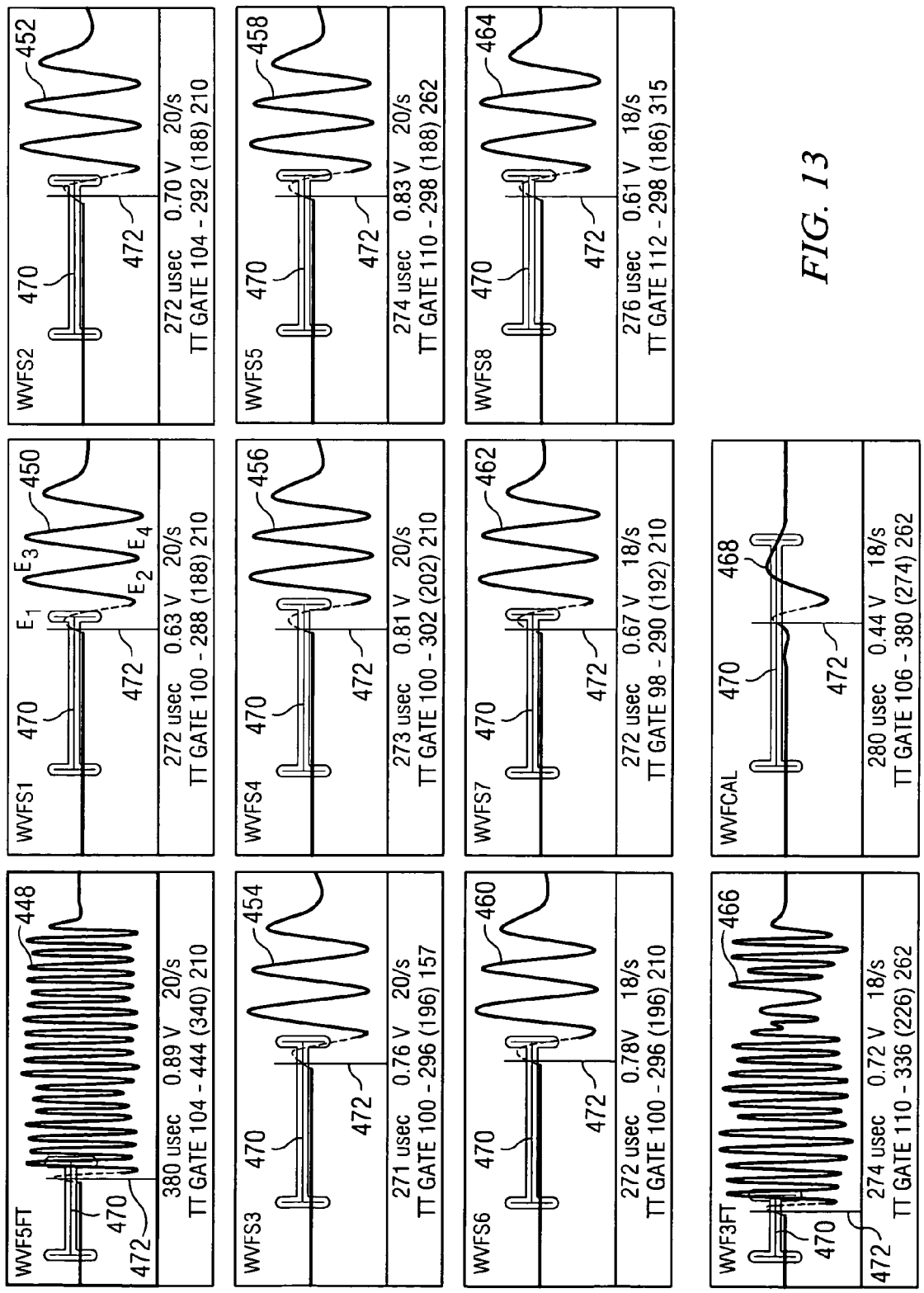
FIG. 13 illustrates a set of output waveform graphs from a single GUI display of the near (WVF3FT), far (WVF5FT), the eight radial sectors (WVFS 1, 2, . . . , 8), and the calibration signal (WVFCAL) from a CBL tool using the segmented transducers according to the present invention.

Looking ahead for a moment to FIG. 13, at the center panel of the top row of waveform panels, there is illustrated a waveform from receiving sector 1 ("WVFS1"). This is a waveform according to an industry standard practice. The signal includes three full cycles, beginning with a positive-going excursion, followed by a damped decay from the positive alternation of a fourth cycle. The first positive peak is designated E1, the first negative peak is designated E2, the second positive peak is designated E3, and the second negative peak is designated E4. Superimposed over the graph before and during the initial cycle of the waveform is a low profile "goal post" outline symbol (part of a graphical user interface provided in the software of the CBL tool of the present invention) that includes a horizontal line (voltage marker 470) within the symbol. This voltage marker 470 is adjusted to indicate the voltage intercept of the E1 peak, a value that is set comfortably above the noise level in the system. The peak voltage value of E1 is the value that the calibration routine adjusts the signal processing section to provide for each channel, thereby normalizing all of the channels to the same value. In a typical application this value of E1 maybe set to approximately 0.75 Volts. The time intercept of the voltage intercept is indicated by a vertical line (time marker 472). The "goal post" symbol is set to begin 100 usec after the sync pulse and continue until the time marker 472. Time marker 472 provides a clearly distinguished "first arrival time" indicator to the surface operator.

Returning to the description for FIG. 11B, the "first arrival time" is calculated in step 412, after the digitized data is retrieved from memory. This instant in time occurs typically approximately 270 microseconds after the sync pulse, corresponding to the arrival of the signals sensed by the near receiver 222. As would be expected, the far receiver signals arrive somewhat later, corresponding to the two-foot greater distance from the transmitter to the far receiver 24. The signal from the far receiver 224 arrives approximately 115 microseconds after the near receiver signals.

Continuing with FIG. 11B, After the first arrival time is calculated, the data is normalized, then decoded in the DAC 260, in step 414 using the stored calibration signals retrieved from the memory in the tool, as described with FIG. 10 herein above. In the next step 416, the analog outputs from the DAC are sent to the analog stage 270 for amplification and conditioning to prepare them for coupling to the output (line) driver 152, or to the memory module 153, in step 418 (See also FIG. 7). The line driver processes the data for display at the surface in step 420 and transmits the analog data signals thereto. In the following step, 422, the routine ends and the control board 220 in the CBL tool returns the routine to the entry point at step 390 to await the next sync pulse.

Figure 12:
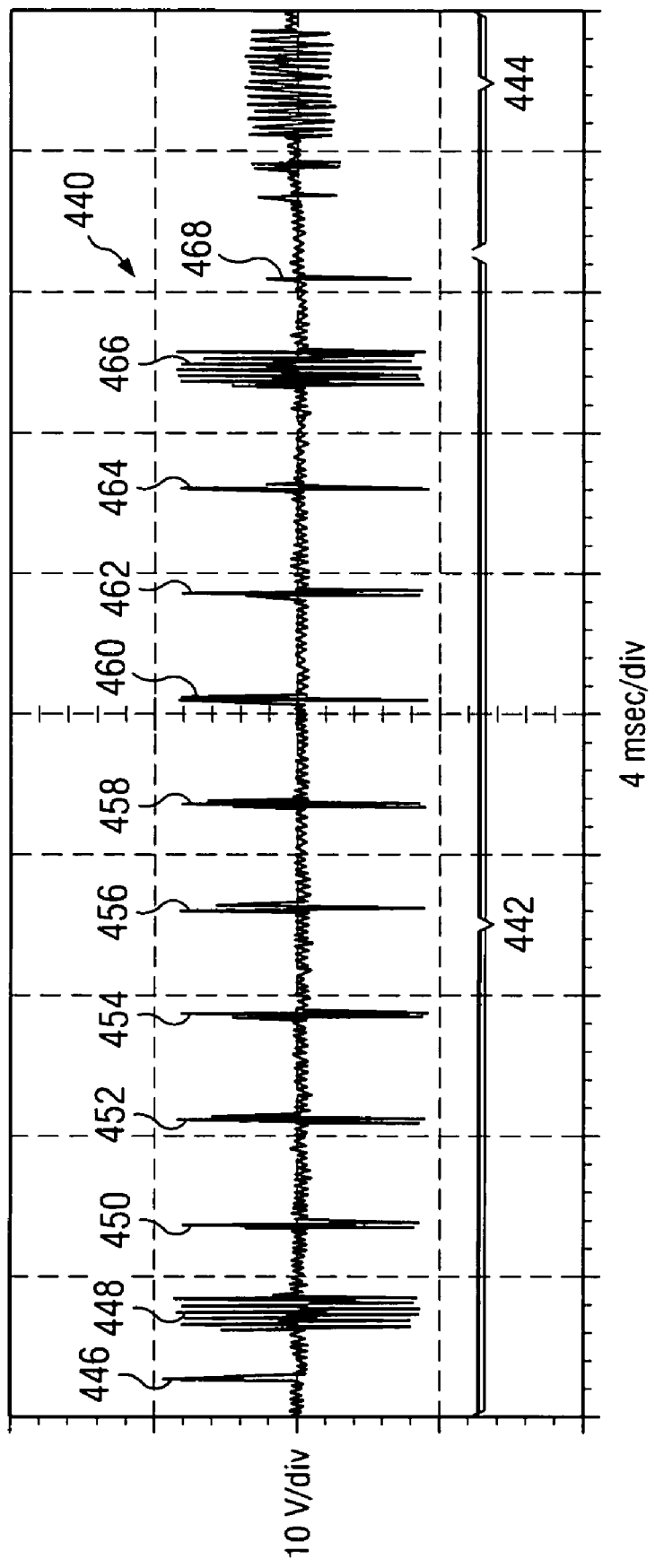
FIG. 12 illustrates an amplitude vs. time graph of the complete sequence of signal outputs occurring in each 50 millisecond interval from the segmented transducers according to the present invention.

Referring to FIG. 12, there is illustrated an amplitude vs. time graph of the complete sequence of signal outputs occurring in each 50 millisecond interval from the segmented transducers according to the present invention. The complete sequence 440 begins with the sync pulse 446, followed by the composite waveform 448 of the far (5') receiver (24 in FIG. 1).

Following the start of the 5' receiver signal 448, at intervals of approximately 3.2 milliseconds, are the eight respective output signals of the eight sectors of the near (3') receiver (22 in FIG. 1). Waveform 450 is the first sector output, 452 the second sector output, 454 the third, and so on to waveform 464, which is the eighth sector output waveform. Next appears the composite waveform 466 of the near (3') receiver 22 output, followed by a calibration signal 468. It will be observed in FIG. 12 that the time elapsed from the sync pulse 446 to the calibration signal 468, indicated in the figure by the longer bracket 442, is just under 32 milliseconds. The remaining time within the 50 millisecond period of the 20 Hz data transmission cycle is approximately 18 milliseconds, part of which is represented by the shorter bracket 444 in the figure, to provide time for transmitting data from other instruments in the CBL tool. In FIG. 12, for example, some telemetry signals conveying other data are shown within the bracketed interval 444 indicated after the calibration signal 468.

Referring to FIG. 13, there is illustrated a set of output waveform graphs from a single GUI display of the far receiver (WVF5FT), the eight radial sectors of the near receiver (WVFS 1, 2, ..., 8), the near receiver (WVF3FT), and the calibration signal (WVFCAL) from a CBL tool using the segmented transducers according to the present invention. The sequence of waveform panels begins with the composite waveform 448 of the far (5') receiver at the upper left corner of FIG. 13. Following the 5' receiver signal 448 are the eight individual output signals of the eight sectors of the near (3') receiver. Waveform 450 is the first sector output, 452 the second sector output, 454 the third, and so on to waveform 464, which is the eighth sector output waveform. Next appears the composite waveform 466 of the near (3') receiver output, followed by the calibration signal 468.

As described previously with FIG. 11B herein above, superimposed over the graphs in each of the waveform panels of the display, before and during the initial cycle of the waveform, is the low profile "goal post" outline symbol of the graphical user interface provided in the software of the CBL tool. The "goal post" symbol includes the horizontal line voltage marker 470 within the symbol. This voltage marker 470 is adjusted to indicate the voltage intercept of the positive-going portion of the El peak, a value that is set comfortably above the noise level in the system. Just above the voltage intercept is the peak voltage value of El. The peak voltage value is the value that the calibration routine adjusts the signal processing section to provide for each channel, thereby normalizing all of the channels to the same value. In a typical application this value of E1 may be set to approximately 0.75 Volts. The time intercept of the voltage intercept is indicated by a vertical line (time marker 472). The "goal post" symbol is set to begin 100 usec after the sync pulse and continue until the time marker 472. Time marker 472 provides a clearly distinguished "first arrival time" indicator to the surface operator.

In the GUI of FIG. 13, as actually displayed on a computer screen, the voltage marker 470 and the time marker 472 may be in a color different than the waveform in order to distinguish them. Similarly, the first cycle of the waveform, or a substantial portion thereof, may be shown in a third color to enable easier recognition. In FIG. 13, this early portion of the waveform is shown as a thinner, dashed line to distinguish it from the waveform drawn in a heavy, continuous line. Further, the "goal post" symbol may be high lighted by a fourth color or shading, or merely outlined by a thin line as shown in FIG. 1.

Continuing with FIG. 13, the same GUI features described in the preceding paragraph are employed in all of the panels of the GUI display illustrated in FIG. 13. In the lower portion of each panel, in two lines of characters, is some additional numerical information about the waveform related to the "goal post" symbol. In the upper line are (a) the first arrival time; (b) the intercept voltage; and (c) the number of waveform data cycles per second, e.g., 20/s, corresponding to 20 data cycles per second, or 20 Hz. In the lower line is a statement about the "travel time" interval (TT GATE) covered by the "goal post" symbol, in the form: start time—end time (duration) and the threshold voltage. The threshold voltage is the height, in millivolts, of the voltage marker line 470 described previously. The three time values are given in microseconds.

The display illustrated in FIG. 13 enables the surface operator to quickly observe the status of all of the cement logging signals sent to the surface instrumentation, along with the calibration pulse for supplying information about the reference used by the tool at the time of the logging is performed. Typically, the far (5') receiver output WVF5FT (waveform 448) is sent to channel one and therefore appears first at the top left corner of the display, followed by, proceeding from left to right, top to bottom, the eight waveforms WVFS1, 2, ..., 8 (waveforms 450 through 464). In the lower left corner of the display appears the near (3') receiver waveform 466 that is a composite of all of the peak values of the individual sectors. The near receiver waveform 466 is shown having greater variability in the amplitudes of the individual alternations of the signal.

The variability of the amplitudes of the peak values of the far and near receiver waveforms, respectively 448 and 466, may be caused by many factors. As is well known, sound travels through substances in several forms. Compressional ("P") waves cause the molecules of the substance to vibrate in the direction of propagation through the substance ("longitudinally") with high velocity and relatively low energy. Shear ("S") waves cause the molecules of the substance to vibrate normal to the direction of propagation with lower velocity but higher energy than P waves. Further, shear waves, because liquids and gases have no shear strength, may travel in solid substances but not liquids or gases. Another type of wave form, not fully understood, is a Stonely wave (aka a "tube" wave) that travels along a liquid/solid interface or boundary. Since these various wave forms propagate or travel at various velocities, their arrival time at a given point will generally also vary depending on the nature and type of substance. Other factors may affect the amplitude, phase, and velocity of the sound signal as it is propagated from the transmitter to the receivers. Given this variety of influences, it is readily appreciated that the output waveforms provided by the receiving transducers are subject to substantial variability. Moreover, interpretation of the transducer waveforms is a complex technical task that is beyond the scope of this detailed description of the present invention. Briefly, and in general, the first portion of the time period during the receipt of an acoustic signal by a receiving transducer, the wave type is compressional, followed by shear waves, compressional waves in fluids, Stoneley waves, etc. The amplitudes of these composite signals representing several properties of the well environment and the formation containing the well will vary as described herein above. It is these kinds of influences which cause the variations that appear in the near and far receiver waveforms illustrated and described herein.

Figure 14:
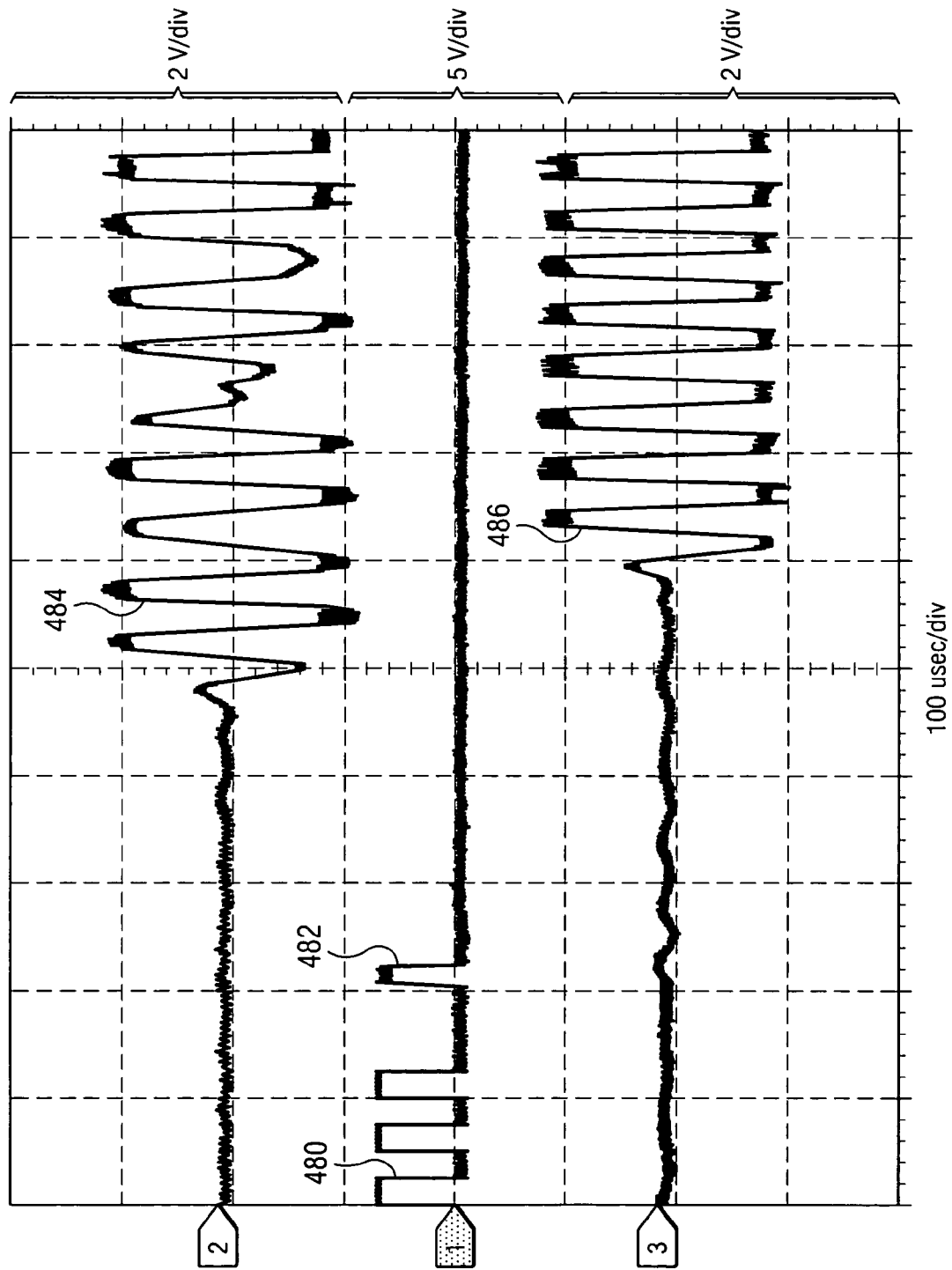
FIG. 14 illustrates an amplitude vs. time graph of the time relationship of the excitation of the transmitting transducer, the sync pulse preceding transmission of the data to the surface, and the near (3 foot) and far (5 foot) receiving transducers of a CBL tool using the segmented transducers according to the present invention.

Referring to FIG. 14, there is illustrated an amplitude vs. time graph of the time relationship of the excitation of the transmitting transducer, the sync pulse preceding transmission of the data to the surface, and the near (3') and far (5') receiving transducers of a CBL tool using the segmented transducers according to the present invention. It should be recalled that the operating frequency of the acoustic transducers in this illustrative embodiment is 20 KHz, that is, the transmitting transducer is excited by a plurality of cycles of a 20 KHz square wave. In the example described herein, this excitation signal 480 is a three-cycle burst as shown at the left of the center waveform graph (line 1). The excitation signal 480 is followed approximately 100 microseconds later by the synchronization signal 482, which is a single pulse of approximately 20 microseconds duration, repeated at a 20 Hz rate or every 50 milliseconds to control the timing of the signal processing cycles. The signal levels on line 1 are otherwise quiescent, except for the system noise level represented by the very small amplitude variations present at the base line, until the next excitation signal 50 microseconds after the preceding one, etc. It will be observed that the system noise also appears on the peak portions of the signals.

Lines 2 and 3 on the graph of FIG. 14 illustrate the early portions of typical waveforms of the near (3') 484 and far (5') 486 receivers respectively. Of interest in these examples are the clear definition, robust amplitude, and the substantial signal-to-noise ratio of the wavefroms of both receivers. These qualities are provided by several features of the present invention, including the segmented configuration of the transducers, the multiple burst excitation of the transmitting transducer, and the high speed digital signal processing employed in the CBL tool that uses the built-in calibration signals to calibrate the tool and normalize the received signals before transmitting them to the surface. Further, the relative timing of the near receiver waveform 484, approximately 270 microseconds after the rising edge of the sync signal 482, is clearly shown. Similarly, the far receiver waveform 486 is seen to appear approximately 115 microseconds after the near receiver waveform, and 385 microseconds after the rising edge of the sync signal 482.

FIGS. 15A, 15B, and 15C illustrate a typical VDL ("Z axis" plot) for a CBL tool embodying the present inventions in FIG. 15A together with a corresponding cement map in FIG. 15B, wherein different colors or shading densities represent different cement densities. Further, an amplitude vs. time graph is shown in FIG. 15C of the signal representing the density information of FIG. 15B. The three figures illustrate different but corresponding presentations derived from the same data. The illustrations are of a small portion—approximately 200 feet of depth in a well that is much more than 7000 feet deep—of an entire graphical display or print out of data. FIG. 15A illustrates the well known variable density log (VDL) display derived from the transducer output signals as previously described with FIGS. 5A and 6A. As noted with FIG. 6A, the graph in FIG. 15A is characterized by substantial completeness and clarity resulting from the clear definition, robust amplitude, and substantial signal-to-noise ratio of the transducer output signals. These qualities enable faster and more accurate interpretation of the data conveyed by the transducer output signals.

Continuing with FIG. 15B, a cement map is portrayed. Wherein the usual representation of the degree of bonding of the cement to the well casing is represented by variations in the color of the display, the depiction in the figure is simulated by representing the color variations as variations in the shading density or gray scale as printed in the black and white drawing. Region 490, representing a bright blue color corresponding to free pipe, that is, well casing pipe in which there is little or no cement bonded to the pipe, is shown as a medium density shading. Region 492, representing a black color corresponding to a substantially complete bonding of the cement to the pipe, is shown as a heavy density shading. Region 494, representing a yellow color corresponding to light-to-moderate bonding of the cement to the pipe, is shown as a light density shading. Region 496, representing a brown color corresponding to mostly complete bonding of the cement to the pipe but with some voids in the bond, is shown as a moderately dense shading.

In FIG. 15C, a simplified graph of the cement bond level or quality, represented by the amplitude of a signal 498 relative to a base line 497 is shown. Along the graph 498, the cement bond levels described for FIG. 15B are marked with the same reference numbers in FIG. 15C. Thus, cement bond levels 490, 492, 494, and 496 are shown in FIG. 15C along the graph 498, corresponding to the shading densities identified with the same reference numbers in FIG. 15B. Thus, a free pipe condition, with little or no cement bonding, is represented by a high amplitude of the graph 498 relative to the base line 497 at the location 490. Similarly, a fully bonded pipe is represented by a low amplitude of the graph 498 relative to the base line 497 at the location 492, a partly bonded pipe is represented by a moderately high amplitude of the graph at the location 494, and a moderately well bonded pipe is represented by a moderately low amplitude of the graph at the location 496. The simplified graph 498 represents a nominal presentation, combining the individual graphs of eight sectors of the receiving transducer. In practice, the individual sectors may indicate substantial variation in the cement bonding around the circumference of the well casing pipe. The dashed line depicts one example of some variations in the cement bonding that may appear in a typical graph form of the cement map display.

The piezoelectric transducer configuration of the present invention disclosed herein provides an axially segmented (divided along planes perpendicular to the longitudinal axis) transducer for transmitting or receiving applications. The transducer is constructed of adjoining cylindrical bands or rings separated by resilient gaskets such as "O" rings and formed into a cylindrical transducer assembly of a length similar to the conventional transducers of like application in cement bond logging tools intended for use in well casings of similar diameter. This segmented configuration enables each of the transducer elements, being much smaller, to resonate at correspondingly higher frequencies, leaving the lower frequency ranges from, for example but not limited to 5 KHz to 50 KHz, free of unwanted spurs, and sub-harmonics or harmonics of the driving frequency.

When operated at the typical 20 KHz frequency, the transducer operates in an anti-resonant mode that is free of the interference, distortion and poor signal-to-noise ratio typically encountered with the conventional unsegmented resonators. Moreover, the capability of operation in the anti-resonant mode permits other frequencies to be utilized with the same transducer, or the use of the anti-resonant transducer to be used in other logging instruments in the same logging tool. This versatility thus enables other properties in the well casing environment to be measured at the same time as the cement bond logging operation is being performed. To achieve adequate signal levels, the plurality of piezoelectric elements assembled to construct the transmitting transducer are driven in parallel at greater energy by multiple pulses. Moreover, the receiving transducer is comprised of multiple segments assembled on the same mandrel and electrically driven in parallel by the same impinging acoustic signal.

The segmented transducer design of the present invention enables substantial improvements in the performance of acoustic logging instrumentation such as the exemplary cement bond logging tool described herein above. When combined with the advanced digital signal processing and the normalization and calibration methods as disclosed for the exemplary cement bond logging tool herein, the segmented transducer provides a number of advantages.

For example, the present invention provides and transmits the data in real time during each logging cycle at 20 times per second. In contrast, conventional tools require six such logging cycles to send complete data for both receivers because they are able to send only ⅓ of the data for each receiver during a logging cycle. Thus the present invention provides the data six times as fast as a conventional cement bond logging tool.

Further, since the present invention can fully process the data so rapidly in real time at each cycle, enabling the data itself to be taken in a few milliseconds of each 50 millisecond cycle, the data 'package' is effectively a snapshot at a substantially stationary depth level in the well casing for all eight sectors of the receiver, rather than obtaining the data for each sector in a helical path around the well casing as the cement bond logging tool is pulled toward the surface.

Further, because of the high speed digital signal processing, the logging tool can be pulled toward the surface at a much higher rate, completing the logging operation in much less time, for example, up to 150 feet per minute. In contrast, the conventional cement logging tool is limited to rates of 30 feet to 70 feet per minute, with some being capable of up to 100 feet per minute.

Moreover, the cement bond logging tool of the present invention includes its own calibration factors stored in memory, enabling the tool to recalibrate itself digitally, on site, in one operation, in less than 15 seconds. With this feature, there is no need to individually—and often iteratively, in a tedious, time consuming process for the conventional logging tools—adjust the analog preamps every time the tool is used or moved, or removed from the well casing. As a result of the built-in calibration process, all of the data is normalized in the tool to free pipe conditions in real time, as the data is processed before transmitting it to the surface during the logging operation. The calibration of the tool constructed in accordance with the present invention is performed with the tool in position in the well casing or in free air before the tool is lowered into position. These attributes of the present invention enable substantial savings of time in on-site operations.

All of the foregoing advantages result from the ability built into the cement logging tool to perform high speed digital signal processing in the tool in real time at temperatures up to 400 degrees Fahrenheit and 25,000 psi, performance heretofore not available in cement bond logging tools. Further, in combination with the axially or longitudinally segmented piezoelectric transducer configuration that is operated in an anti-resonant mode and excites the transmitter transducer with multiple, high energy drive pulses, the data provided has a substantially greater signal-to-noise ratio and significantly improved definition of the signals corresponding to the quality of the cement bond and of the lithology of the terrain surrounding the bore hole. The results are clearly manifest in the cleaner and more informative VDL plots and cement maps provided by the data from the instrumentation.

While the invention has been shown in only one of its forms, it is not thus limited but is susceptible to various changes and modifications without departing from the spirit thereof.

What is claimed is:

1. A method for processing electrical signals produced by an acoustic receiver in a logging tool, comprising the steps of:

providing in the logging tool a transmitting transducer and a longitudinally segmented acoustic receiving transducer having a plurality of band-like transducer rings of equal diameter assembled into a cylindrical form and having an output, wherein each adjacent pair of transducer rings is separated by a circular resilient gasket disposed between corresponding adjacent edges thereof;

issuing synchronizing pulses to the longitudinally segmented receiving transducer at a predetermined repetition rate; and processing output signals of the longitudinally segmented receiving transducer on-depth and in real time for a full set of azimuths at each depth associated with a successive repetition of the synchronizing pulses.

2. The method of claim 1, further comprising the step of:
pulling the logging tool toward the surface at a predetermined rate of at least 30 feet per minute.

3. The method of claim 1, further comprising the step of:
pulling the logging tool toward the surface at a predetermined rate of at least 100 feet per minute.

4. The method of claim 1, wherein the step of providing comprises the steps of:

providing a first receiving transducer displaced approximately three feet along a longitudinal axis from the transmitter transducer; and providing a second receiving transducer displaced along the longitudinal axis approximately five feet from the transmitter transducer opposite the first receiving transducer from the transmitter transducer; wherein the second receiving transducer is configured as a longitudinally segmented receiving transducer.

5. The method of claim 1, wherein the step of issuing comprises setting the predetermined repetition rate at approximately 20 KHz.

6. The method of claim 1, wherein the step of issuing comprises setting the predetermined repetition rate at a frequency greater than 10 KHz.

7. The method of claim 1, wherein the step of processing further comprises the steps of:

summing the output signals of each of the receiving transducer rings in parallel;

sampling and digitizing the summed output to produce digitized waveform data;

storing the digitized waveform data in a memory in the logging tool; and performing output pre-processing of the digitized waveform data retrieved from the memory in the logging tool.

8. The method of claim 7, wherein the step of performing further comprises the steps of:

extracting the digitized waveform data from the memory in the logging tool;

normalizing the digitized waveform data according to calibration data stored in the memory of the logging tool;

converting the normalized data to serial, analog form; and transmitting the analog data to surface instrumentation.

9. The method of claim 8, wherein the step of normalizing comprises the steps of:

initializing circuitry in the logging tool for executing a normalization program upon a predetermined sequence of transmitter excitation signals;

executing the normalization program to produce digital gain factors based on an average value N of a plurality of representative samples of a received signal; and obtaining a digital gain factor for use with each channel of the logging tool signal processing circuitry.

10. The method of claim 9, wherein the step of initializing comprises the steps of:
   causing the circuitry in the logging tool to enter a calibration mode;
   enabling excitation signals to the transmitter for a predetermined number of firing cycles for each channel m provided in the signal processing circuitry; and
   setting a signal peak acceptance threshold.

11. The method of claim 10, wherein the predetermined number of firing cycles is set to 100 cycles.

12. The method of claim 9, wherein the step of executing comprises the steps of:
   digitizing a predetermined number of received signals and storing peak values of the digitized received signals in memory;
   sorting the stored peak values according to a predetermined criteria to provide a set of representative samples;
   averaging the set of representative samples to provide the average value N; and
   repeating the step of executing for remaining channels of the signal processing circuitry.

13. The method of claim 12, wherein:
   the predetermined number of received signals is set to at least a majority of signals received during a firing cycle; and
   the predetermined criteria includes eliminating an equal percentage of highest valued and lowest valued representative samples.

14. The method of claim 13, wherein:
   the predetermined number is equal to 80 percent of the number of firing cycles; and
   the equal percentage predetermined for the criteria is set to 25 percent.

15. The method of claim 9, wherein the step of obtaining comprises the steps of:
   selecting a standard value for a received input signal, Vin, std.;
   calculating a digital gain factor $Fc=(Vin,std.)$ divided by N; and
   storing values for Fc for all channels in a memory in the logging tool.

16. The method of claim 7, wherein the step of performing further comprises the steps of:
   extracting the digitized waveform data from the memory in the logging tool;
   normalizing the digitized waveform data according to calibration data stored in the memory of the logging tool; and
   storing the normalized data in digital form in non-volatile memory for subsequent retrieval.

* * * * *

UNITED STATES PATENT AND TRADEMARK OFFICE
CERTIFICATE OF CORRECTION

PATENT NO. : 7,411,864 B2 Page 1 of 1
APPLICATION NO. : 11/233720
DATED : August 12, 2008
INVENTOR(S) : Hurst et al.

It is certified that error appears in the above-identified patent and that said Letters Patent is hereby corrected as shown below:

Title Pg, Item (54) Title & Col. 1, Lines 1-2 should read as follows:

METHOD FOR PROCESSING SIGNALS IN A CEMENT BOND LOGGING TOOL

Signed and Sealed this

Thirtieth Day of September, 2008

JON W. DUDAS
*Director of the United States Patent and Trademark Office*